United States Patent
Hergenrother et al.

(10) Patent No.: US 10,407,522 B1
(45) Date of Patent: Sep. 10, 2019

(54) NANOPARTICLE FILLERS AND METHODS OF MIXING INTO ELASTOMERS

(71) Applicant: Bridgestone Corporation, Tokyo (JP)

(72) Inventors: William L. Hergenrother, Akron, OH (US); Waruna C. B. Kiridena, Copley, OH (US); James H. Pawlow, Akron, OH (US); James D. Ulmer, Akron, OH (US); Christopher G. Robertson, Akron, OH (US); Michael Davis, Independence, OH (US); Jeffrey Quinn, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 46 days.

(21) Appl. No.: 15/250,025

(22) Filed: Aug. 29, 2016

Related U.S. Application Data

(62) Division of application No. 13/731,666, filed on Dec. 31, 2012, now Pat. No. 9,428,604.

(60) Provisional application No. 61/582,226, filed on Dec. 30, 2011.

(51) Int. Cl.
*C08F 212/08* (2006.01)
*C08J 3/00* (2006.01)
*C08L 9/06* (2006.01)
*C08L 9/08* (2006.01)
*C08L 13/02* (2006.01)

(52) U.S. Cl.
CPC ............ *C08F 212/08* (2013.01); *C08J 3/005* (2013.01); *C08L 9/06* (2013.01); *C08L 9/08* (2013.01); *C08L 13/02* (2013.01); *C08J 2309/06* (2013.01); *C08J 2309/08* (2013.01); *C08J 2313/02* (2013.01); *C08J 2425/08* (2013.01)

(58) Field of Classification Search
CPC ........... C08F 212/08; C08J 3/005; C08L 9/06; C08L 9/08; C08L 13/02
USPC ...................................................... 523/201
See application file for complete search history.

(56) References Cited

U.S. PATENT DOCUMENTS

| | | |
|---|---|---|
| 2,531,396 A | 11/1950 | Carter et al. |
| 3,177,186 A | 4/1965 | Miller |
| 3,598,884 A | 8/1971 | Wei et al. |
| 3,793,402 A | 2/1974 | Owens |
| 3,840,620 A | 10/1974 | Gallagher |
| 3,927,143 A | 12/1975 | Makowski et al. |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,248,986 A | 2/1981 | Lai et al. |
| 4,326,008 A | 4/1982 | Rembaum |
| 4,386,125 A | 5/1983 | Shiraki et al. |
| 4,408,018 A | 10/1983 | Bartman et al. |
| 4,417,029 A | 11/1983 | Milkovich |
| 4,471,093 A | 9/1984 | Furukawa et al. |
| 4,543,403 A | 9/1985 | Isayama et al. |
| 4,600,749 A | 7/1986 | Minekawa et al. |
| 4,617,346 A | 10/1986 | Sonoda |
| 4,659,782 A | 4/1987 | Spinelli |
| 4,659,790 A | 4/1987 | Shimozato et al. |
| 4,717,655 A | 1/1988 | Fluwyler |
| 4,722,770 A | 2/1988 | Blottiere et al. |
| 4,725,522 A | 2/1988 | Breton et al. |
| 4,764,572 A | 8/1988 | Bean, Jr. |
| 4,774,189 A | 9/1988 | Schwartz |
| 4,798,691 A | 1/1989 | Kasai et al. |
| 4,818,785 A | 4/1989 | Otawa et al. |
| 4,829,135 A | 5/1989 | Gunesin et al. |
| 4,837,274 A | 6/1989 | Kawakubo et al. |
| 4,837,401 A | 6/1989 | Hirose et al. |
| 4,861,131 A | 8/1989 | Bois et al. |
| 4,870,144 A | 9/1989 | Noda et al. |
| 4,871,814 A | 10/1989 | Gunesin et al. |
| 4,904,730 A | 2/1990 | Moore et al. |
| 4,920,160 A | 4/1990 | Chip et al. |
| 4,942,209 A | 7/1990 | Gunesin |
| 4,987,202 A | 1/1991 | Zeigler |
| 5,036,138 A | 7/1991 | Stamhuis et al. |
| 5,066,729 A | 11/1991 | Srayer, Jr. et al. |
| 5,073,498 A | 12/1991 | Schwartz et al. |
| 5,075,377 A | 12/1991 | Kawakubo et al. |

(Continued)

FOREIGN PATENT DOCUMENTS

| | | |
|---|---|---|
| CA | 2127919 | 3/1995 |
| CN | 1560094 | 1/2005 |

(Continued)

OTHER PUBLICATIONS

Dow—Divinylbenzene (DVB) Brochure—Downloaded Nov. 1, 2017 Online—Feb. 10, 2003 (http://msdssearch.dow.com/PublishedLiteratureDOWCOM/dh_0953/0901b803809530f8.pdf.*

(Continued)

*Primary Examiner* — Ronald Grinsted
(74) *Attorney, Agent, or Firm* — Meredith E. Hooker; Nathan T. Lewis

(57) ABSTRACT

A nanoparticle includes a copolymer comprising a vinyl-aromatic monomer and a heterocyclic monomer. The copolymer is crosslinked with a multifunctional crosslinking agent polymerizable through an addition reaction. A nanoparticle and elastomer composition is disclosed. Several methods of mixing heterocyclic and non-heterocyclic monomer nanoparticles into an elastomer are also disclosed. These methods include mixing in a multi-elements static mixer and an intermeshing mixer with venting, among others.

16 Claims, 6 Drawing Sheets

(56) References Cited

U.S. PATENT DOCUMENTS

| | | | |
|---|---|---|---|
| 5,130,377 | A | 7/1992 | Trepka et al. |
| 5,169,914 | A | 12/1992 | Kaszas et al. |
| 5,183,851 | A | 2/1993 | Visani et al. |
| 5,194,300 | A | 3/1993 | Cheung |
| 5,219,945 | A | 6/1993 | Dicker et al. |
| 5,227,419 | A | 7/1993 | Moczygemba et al. |
| 5,237,015 | A | 8/1993 | Urban |
| 5,241,008 | A | 8/1993 | Hall |
| 5,256,736 | A | 10/1993 | Trepka et al. |
| 5,290,875 | A | 3/1994 | Moczygemba et al. |
| 5,290,878 | A | 3/1994 | Yamamoto et al. |
| 5,296,547 | A | 3/1994 | Nestegard et al. |
| 5,298,559 | A | 3/1994 | Fuji et al. |
| 5,329,005 | A | 7/1994 | Lawson et al. |
| 5,331,035 | A | 7/1994 | Hall |
| 5,336,712 | A | 8/1994 | Austgen, Jr. et al. |
| 5,362,794 | A | 11/1994 | Inui et al. |
| 5,395,891 | A | 3/1995 | Obrecht et al. |
| 5,395,902 | A | 3/1995 | Hall |
| 5,399,628 | A | 3/1995 | Moczygemba et al. |
| 5,399,629 | A | 3/1995 | Coolbaugh et al. |
| 5,405,903 | A | 4/1995 | Van Westrenen et al. |
| 5,421,866 | A | 6/1995 | Stark-Kasley et al. |
| 5,436,298 | A | 7/1995 | Moczygemba et al. |
| 5,438,103 | A | 8/1995 | DePorter et al. |
| 5,462,994 | A | 10/1995 | Lo et al. |
| 5,514,734 | A | 5/1996 | Maxfield et al. |
| 5,514,753 | A | 5/1996 | Ozawa et al. |
| 5,521,309 | A | 5/1996 | Antkowiak et al. |
| 5,525,639 | A | 6/1996 | Keneko et al. |
| 5,534,592 | A | 7/1996 | Halasa et al. |
| 5,587,423 | A | 12/1996 | Brandstetter et al. |
| 5,594,072 | A | 1/1997 | Handlin, Jr. et al. |
| 5,614,579 | A | 3/1997 | Roggeman et al. |
| 5,674,592 | A | 10/1997 | Clark et al. |
| 5,686,528 | A | 11/1997 | Wills et al. |
| 5,688,856 | A | 11/1997 | Austgen, Jr. et al. |
| 5,700,897 | A | 12/1997 | Klainer et al. |
| 5,728,791 | A | 3/1998 | Tamai et al. |
| 5,733,975 | A | 3/1998 | Aoyama et al. |
| 5,742,118 | A | 4/1998 | Endo et al. |
| 5,747,152 | A | 5/1998 | Oka et al. |
| 5,763,551 | A | 6/1998 | Wunsch et al. |
| 5,773,521 | A | 6/1998 | Hoxmeier et al. |
| 5,834,563 | A | 11/1998 | Kimura et al. |
| 5,847,054 | A | 12/1998 | McKee et al. |
| 5,849,847 | A | 12/1998 | Quirk |
| 5,891,947 | A | 4/1999 | Hall et al. |
| 5,897,811 | A | 4/1999 | Lesko |
| 5,905,116 | A | 5/1999 | Wang et al. |
| 5,910,530 | A | 6/1999 | Wang et al. |
| 5,955,537 | A | 9/1999 | Steininger et al. |
| 5,986,010 | A | 11/1999 | Clites et al. |
| 5,994,468 | A | 11/1999 | Wang et al. |
| 6,011,116 | A | 1/2000 | Aoyama et al. |
| 6,046,275 | A | 4/2000 | Nakano et al. |
| 6,075,092 | A | 6/2000 | Nakamura et al. |
| 6,087,016 | A | 7/2000 | Feeney et al. |
| 6,117,932 | A | 9/2000 | Hasegawa et al. |
| 6,127,488 | A | 10/2000 | Obrecht et al. |
| 6,166,855 | A | 12/2000 | Ikeyama et al. |
| 6,180,693 | B1 | 1/2001 | Tang et al. |
| 6,191,217 | B1 | 2/2001 | Wang et al. |
| 6,204,354 | B1 | 3/2001 | Wang et al. |
| 6,207,263 | B1 | 3/2001 | Takematsu et al. |
| 6,252,014 | B1 | 6/2001 | Knauss |
| 6,268,451 | B1 | 7/2001 | Faust et al. |
| 6,379,791 | B1 | 4/2002 | Cernohous et al. |
| 6,383,500 | B1 | 5/2002 | Wooley et al. |
| 6,395,829 | B1 | 5/2002 | Miyamoto et al. |
| 6,437,050 | B1 | 8/2002 | Krom et al. |
| 6,441,090 | B1 | 8/2002 | Demirors et al. |
| 6,448,353 | B1 | 9/2002 | Nelson et al. |
| 6,489,378 | B1 | 12/2002 | Sosa et al. |
| 6,492,466 | B2 | 12/2002 | Willis et al. |
| 6,506,567 | B2 | 1/2003 | Makino et al. |
| 6,524,595 | B1 | 2/2003 | Perrier et al. |
| 6,573,313 | B2 | 6/2003 | Li et al. |
| 6,573,330 | B1 | 6/2003 | Fujikake et al. |
| 6,649,702 | B1 | 11/2003 | Rapoport et al. |
| 6,663,960 | B1 | 12/2003 | Murakami et al. |
| 6,689,469 | B2 | 2/2004 | Wang et al. |
| 6,693,746 | B1 | 2/2004 | Nakamura et al. |
| 6,706,823 | B2 | 3/2004 | Wang et al. |
| 6,727,307 | B2 | 4/2004 | Kondo et al. |
| 6,737,486 | B2 | 5/2004 | Wang |
| 6,774,185 | B2 | 8/2004 | Lin et al. |
| 6,777,500 | B2 | 8/2004 | Lean et al. |
| 6,780,937 | B2 | 8/2004 | Castner |
| 6,872,785 | B2 | 3/2005 | Wang et al. |
| 6,875,818 | B2 | 4/2005 | Wang |
| 6,956,084 | B2 | 10/2005 | Wang et al. |
| 7,056,840 | B2 | 6/2006 | Miller et al. |
| 7,067,199 | B2 | 6/2006 | Hattori et al. |
| 7,071,246 | B2 | 7/2006 | Xie et al. |
| 7,112,369 | B2 | 9/2006 | Wang et al. |
| 7,179,864 | B2 | 2/2007 | Wang |
| 7,193,004 | B2 | 3/2007 | Weydert et al. |
| 7,205,370 | B2 | 4/2007 | Wang et al. |
| 7,217,775 | B2 | 5/2007 | Castner |
| 7,238,751 | B2 | 7/2007 | Wang et al. |
| 7,244,783 | B2 | 7/2007 | Lean et al. |
| 7,291,394 | B2 | 11/2007 | Winkler et al. |
| 7,347,237 | B2 | 3/2008 | Xie et al. |
| 7,408,005 | B2 | 8/2008 | Zheng et al. |
| 7,538,159 | B2 | 5/2009 | Wang et al. |
| 7,544,740 | B2 | 6/2009 | Wang et al. |
| 7,553,909 | B2 | 6/2009 | Wang et al. |
| 7,560,510 | B2 | 7/2009 | Wang et al. |
| 7,597,959 | B2 | 10/2009 | Wang et al. |
| 7,649,049 | B2 | 1/2010 | Kleckner et al. |
| 7,659,342 | B2 | 2/2010 | Wang et al. |
| 7,695,813 | B2 | 4/2010 | Schultes et al. |
| 7,718,737 | B2 | 5/2010 | Wang et al. |
| 7,718,738 | B2 | 5/2010 | Bohm et al. |
| 7,786,236 | B2 | 8/2010 | Wang et al. |
| 7,795,344 | B2 | 9/2010 | Wang et al. |
| 7,820,771 | B2 | 10/2010 | Lapra et al. |
| 7,829,624 | B2 | 11/2010 | Warren |
| 7,884,160 | B2 | 2/2011 | Wang et al. |
| 7,897,690 | B2 | 3/2011 | Wang et al. |
| 7,998,554 | B2 | 8/2011 | Wang et al. |
| 8,063,142 | B2 | 11/2011 | Wang et al. |
| 8,349,964 | B2 | 1/2013 | Wang et al. |
| 8,410,225 | B2 | 4/2013 | Wang et al. |
| 8,541,503 | B2 | 9/2013 | Wang et al. |
| 8,697,775 | B2 | 4/2014 | Hall et al. |
| 8,846,819 | B2 | 9/2014 | Chen et al. |
| 8,877,250 | B2 | 11/2014 | Wang et al. |
| 8,957,154 | B2 | 2/2015 | Wang et al. |
| 9,061,900 | B2 | 6/2015 | Scurati et al. |
| 9,062,144 | B2 | 6/2015 | Wang et al. |
| 9,115,222 | B2 | 8/2015 | Kitano et al. |
| 9,428,604 | B1 | 8/2016 | Hergenrother et al. |
| 9,493,601 | B2 | 11/2016 | Wang et al. |
| 2001/0053813 | A1 | 12/2001 | Konno et al. |
| 2002/0007011 | A1 | 1/2002 | Konno et al. |
| 2002/0045714 | A1 | 4/2002 | Tomalia et al. |
| 2003/0124353 | A1 | 7/2003 | Wang et al. |
| 2003/0149185 | A1 | 8/2003 | Wang et al. |
| 2003/0171522 | A1 | 9/2003 | Brandenburg |
| 2003/0198810 | A1 | 10/2003 | Wang et al. |
| 2003/0225190 | A1 | 12/2003 | Borbely et al. |
| 2004/0033345 | A1 | 2/2004 | Dubertret et al. |
| 2004/0059057 | A1 | 3/2004 | Swisher et al. |
| 2004/0065425 | A1 | 4/2004 | Irwin et al. |
| 2004/0091546 | A1 | 5/2004 | Johnson et al. |
| 2004/0127603 | A1 | 7/2004 | Lean et al. |
| 2004/0143064 | A1 | 7/2004 | Wang |
| 2004/0198917 | A1 | 10/2004 | Castner |
| 2004/0202881 | A1 | 10/2004 | Everaerts et al. |
| 2005/0006014 | A1 | 1/2005 | Halasa et al. |
| 2005/0101743 | A1 | 5/2005 | Stacy et al. |
| 2005/0122819 | A1 | 6/2005 | Park et al. |

(56) References Cited

U.S. PATENT DOCUMENTS

| | | |
|---|---|---|
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0220750 A1 | 10/2005 | Robert et al. |
| 2005/0220890 A1 | 10/2005 | Charmot et al. |
| 2005/0228074 A1 | 10/2005 | Wang et al. |
| 2005/0282956 A1 | 12/2005 | Bohm et al. |
| 2005/0288393 A1 | 12/2005 | Lean et al. |
| 2006/0084722 A1 | 4/2006 | Lin et al. |
| 2006/0116473 A1 | 6/2006 | Castner et al. |
| 2006/0141150 A1 | 6/2006 | Zheng et al. |
| 2006/0147714 A1 | 7/2006 | Schultes et al. |
| 2006/0173130 A1 | 8/2006 | Wang et al. |
| 2006/0280798 A1 | 12/2006 | Ensoli |
| 2007/0081830 A1 | 4/2007 | Bender et al. |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0149652 A1 | 6/2007 | Yoon et al. |
| 2007/0161754 A1 | 7/2007 | Bohm et al. |
| 2007/0181302 A1 | 8/2007 | Bicerano |
| 2007/0185273 A1 | 8/2007 | Hall et al. |
| 2007/0196653 A1 | 8/2007 | Hall et al. |
| 2008/0001116 A1 | 1/2008 | Fredrickson et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0171272 A1 | 7/2008 | Nakashima et al. |
| 2008/0176999 A1* | 7/2008 | Tamai ................ C08F 257/02 525/63 |
| 2008/0188579 A1 | 8/2008 | Wang et al. |
| 2008/0242813 A1 | 10/2008 | Zheng et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |
| 2009/0209707 A1 | 8/2009 | Okunaka et al. |
| 2009/0270558 A1 | 10/2009 | Gandon-Pain et al. |
| 2009/0306246 A1 | 12/2009 | Gervat et al. |
| 2010/0004365 A1 | 1/2010 | Saliya et al. |
| 2010/0004398 A1 | 1/2010 | Wang et al. |
| 2010/0016472 A1 | 1/2010 | Wang et al. |
| 2010/0016512 A1 | 1/2010 | Wang et al. |
| 2010/0247845 A1 | 9/2010 | Haruta et al. |
| 2010/0324167 A1 | 12/2010 | Warren et al. |
| 2011/0008607 A1 | 1/2011 | Haruta et al. |
| 2011/0021702 A1 | 1/2011 | Gandon-Pain et al. |
| 2011/0024011 A1 | 2/2011 | Castner et al. |
| 2011/0172364 A1 | 7/2011 | Yaohong et al. |
| 2011/0213066 A1* | 9/2011 | Wang ................ C08F 297/046 524/505 |
| 2011/0236686 A1 | 9/2011 | Kitano et al. |
| 2012/0108724 A1 | 5/2012 | Obrecht |
| 2012/0132346 A1 | 5/2012 | Chen et al. |
| 2015/0017446 A1 | 1/2015 | Chen et al. |
| 2015/0045463 A1 | 2/2015 | Wang et al. |
| 2015/0291719 A1 | 10/2015 | Wang et al. |
| 2016/0039964 A1 | 2/2016 | Kitano et al. |

FOREIGN PATENT DOCUMENTS

| | | |
|---|---|---|
| DE | 3735403 | 5/1989 |
| DE | 4241538 A1 | 6/1994 |
| EP | 0143500 | 6/1985 |
| EP | 0265142 A2 | 4/1988 |
| EP | 3322905 | 7/1989 |
| EP | 0352042 | 1/1990 |
| EP | 0472344 | 2/1992 |
| EP | 0590491 A2 | 4/1994 |
| EP | 0742268 | 11/1996 |
| EP | 1783168 | 5/2007 |
| JP | 70002106 B | 1/1970 |
| JP | 2191619 | 7/1990 |
| JP | 2196893 | 8/1990 |
| JP | 06093057 | 4/1994 |
| JP | 06248017 | 9/1994 |
| JP | 7011043 | 1/1995 |
| JP | 08199062 | 8/1996 |
| JP | 2000514791 | 11/2000 |
| JP | 2004018557 A | 1/2004 |
| JP | 2005537341 | 12/2005 |
| JP | 2006072283 | 3/2006 |
| JP | 2006106596 | 4/2006 |
| JP | 2007304409 | 11/2007 |
| JP | 2008069346 A | 3/2008 |
| JP | 2008239769 A | 10/2008 |
| JP | 2008274006 A | 11/2008 |
| JP | 5973514 A | 3/2015 |
| KR | 1020080057319 | 6/2008 |
| KR | 10-1586096 A | 5/2010 |
| RU | 2184125 | 6/2002 |
| RU | 2274647 C2 | 4/2006 |
| RU | 2282637 C2 | 8/2006 |
| SU | 465010 | 3/1975 |
| WO | 9104992 | 4/1991 |
| WO | 9704029 | 2/1997 |
| WO | 0187999 A2 | 11/2000 |
| WO | 0202472 | 1/2002 |
| WO | 0231002 A1 | 4/2002 |
| WO | 0241987 | 5/2002 |
| WO | 0244290 | 6/2002 |
| WO | 02100936 | 12/2002 |
| WO | 03032061 | 4/2003 |
| WO | 2006069793 | 7/2006 |
| WO | 2008014464 | 1/2008 |
| WO | 2008079276 | 7/2008 |
| WO | 2008079807 | 7/2008 |
| WO | 2009006434 | 1/2009 |
| WO | 03106557 A1 | 12/2013 |

OTHER PUBLICATIONS

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Bradley John S., "The Chemistry of Transition Metal Colloids", Clusters and Colloids: From Theory to Applications, Chapter 6, Weinheim, VCH, pp. 459-544 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Calderara, Frederic et al., "Synthesis of chromophore-labelled polystyrene/poly(ethylene oxide) diblock copolymers", Makromol. Chem., 194, pp. 1411-1420 (1993).

Chen, Ming-Qing et al., "Graft Copolymers Having Hydrophobic Backbone and Hydrophilic Branches. XXIII. Particle Size Control of Poly(ethylene glycol)-Coated Polystyrene Nanoparticles Pre-

(56) References Cited

OTHER PUBLICATIONS pared by Macromonomer Method", Journal of Polymer Science: Part A: Polymer Chemistry, vol. 37, pp. 2155-2166 (1999).
Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).
Erhardt, Rainer et al., "Janus Micelles", Macromolecules, vol. 34, No. 4, pp. 1069-1075 (2001).
Eschwey, Helmut et al., "Preparation and Some Properties of Star-Shaped Polymers with more than Hundred Side Chains", Die Makromolekulare Chemie 173, pp. 235-239 (1973).
Eschwey, Helmut et al., "Star polymers from styrene and divinylbenzene", Polymer, vol. 16, pp. 180-184 (Mar. 1975).
Fendler, Janos H., "Nanoparticles and Nanostructured Films: Preparation, Characterization and Applications", Wiley-VCH, pp. 1-468 (1998).
Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).
Hamley, Ian W., "The Physics of Block Copolymers", Oxford Science Publication: Oxford, Chapters 3 and 4, pp. 131-265, (1998).
Ishizu, Koji et al., "Synthesis of Star Polymer with Nucleus of Microgel", Polymer Journal, vol. 12, No. 6, pp. 399-404 (1980).
Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).
Liu, Guojun et al., "Diblock Copolymer Nanofibers", Macromolecules, 29, pp. 5508-5510 (1996).
Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).
Ma, Qinggao et al., "Entireely Hydrophilic Shell Cross-Linked Knedel-Like (SCK) Nanoparticles", Polymer Preprints, vol. 41, No. 2, pp. 1571-1572 (2000).
Mayer, A.B.R. et al., "Transition metal nanoparticles protected by amphiphilic block copolymers as tailored catalyst systems", Colloid Polym. Sci., 275, pp. 333-340 (1997).
Mi, Yongli et al., "Glass transition of nano-sized single chain globules", Polymer 43, Elsevier Science Ltd., pp. 6701-6705 (2002).
Nace, Vaughn M., "Nonionic Surfactants: Polyoxyalkylene Block Copolymers", Surfactant Science Series, vol. 60, pp. 1-266 (1996).
Okay, Oguz et al., "Steric stabilization of reactive microgels from 1,4-divinylbenzene", Makromol. Chem., Rapid Commun., vol. 11, pp. 583-587 (1990).
Okay, Oguz et al., "Anionic Dispersion Polymerization of 1,4-Divinylbenzene", Macromolecules, 23, pp. 2623-2628 (1990).
Piirma, Irja, "Polymeric Surfactants", Surfactant Science Series, vol. 42, pp. 1-289 (1992).
Price, Colin, "Colloidal Properties of Block Copolymers", Applied Science Publishers Ltd., Chapter 2, pp. 39-80 (1982).
Rager, Timo et al., "Micelle formation of poly(acrylic acid)-block-poly(methyl methacrylate) block copolymers in mixtures of water with organic solvents", Macromol. Chem. Phys., 200, No. 7, pp. 1672-1680 (1999).
Rein, David H. et al., "Kinetics of arm-first star polymers formation in a non-polar solvent", Macromol. Chem. Phys., vol. 199, pp. 569-574 (1998).
Rempp, Paul et al., "Grafting and Branching of Polymers", Pure Appl. Chem., vol. 30, pp. 229-238 (1972).
Riess, Gerard et al., "Block Copolymers", Encyclopedia of Polymer Science and Engineering, vol. 2, pp. 324-434 (1985).
Saito, Reiko et al., "Synthesis of Microspheres with Microphase-Separated Shells", Journal of Polymer Science: Part A: Polymer Chemistry, vol. 38, pp. 2091-2097 (2000).
Serizawa, Takeshi et al., "Transmission Electron Microscopic Study of Cross-Sectional Morphologies of Core-Corona Polymeric Nanospheres", Macromolecules, 33, pp. 1759-1764 (2000).

Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).
Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).
Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).
Tsitsilianis, Constantinos et al., "Synthesis and characterization of hetero-arm star copolymers", Makromol. Chem. 191, pp. 2319-2328 (1990).
Tuzar, Zdenek et al., "Micelles of Block and Graft Copolymers in Solutions", Surface and Colloid Science, vol. 15, Chapter 1, pp. 1-83 (1993).
Vamvakaki, M. et al., "Synthesis of novel block and statistical methacrylate-based ionomers containing acidic, basic or betaine residues", Polymer, vol. 39, No. 11, pp. 2331-2337 (1998).
Van der Maarel, J.R.C. et al., "Salt-Induced Contraction of Polyelectrolyte Diblock Copolymer Micelles", Langmuir, vol. 16, No. 19, pp. 7510-7519 (2000).
Wang, Xiaorong et al., "Chain conformation in two-dimensional dense state", Journal of Chemical Physics, vol. 121, No. 16, pp. 8158-8162 (Oct. 22, 2004).
Wang, Xiaorong et al., "Synthesis, Characterization, and Application of Novel Polymeric Nanoparticles", Macromolecules, 40, pp. 499-508 (2007).
Webber, Stephen E. et al., "Solvents and Self-Organization of Polymers", NATO ASI Series, Series E: Applied Sciences, vol. 327, pp. 1-509 (1996).
Wooley, Karen L., "From Dendrimers to Knedel-like Structures", Chem. Eur. J., 3, No. 9, pp. 1397-1399 (1997).
Wooley, Karen L., "Shell Crosslinked Polymer Assemblies: Nanoscale Constructs Inspired from Biological Systems", Journal of Polymer Science: Part A: Polymer Chemistry, vol. 38, pp. 1397-1407 (2000).
Worsfold, Denis J., "Anionic Copolymerization of Styrene with p-Divinylbenzene", Macromolecules, vol. 3, No. 5, pp. 514-517 (Sep.-Oct. 1970).
Zheng, Lei et al., "Polystyrene Nanoparticles with Anionically Polymerized Polybutadiene Brushes", Macromolecules, 37, pp. 9954-9962 (2004).
Lipman, Bernard, Mar. 25, 2004 Restriction/Election Office Action from U.S. Appl. No. 10/331,841 (6 pp.).
Lipman, Bernard, Mar. 24, 2004 Restriction/Election Office Action from U.S. Appl. No. 10/345,498 (5 pp.).
Choi, Ling Siu, Mar. 24, 2006 Office Action from U.S. Appl. No. 10/755,648 (11 pp.).
Asinovsky, Olga, Aug. 16, 2007 Advisory Action from U.S. Appl. No. 10/791,049 (2 pp.).
Asinovsky, Olga, Jul. 29, 2008 Advisory Action from U.S. Appl. No. 10/791,049 (3 pp.).
Harlan, Robert D., Jan. 9, 2008 Advisory Action from U.S. Appl. No. 10/791,177 (3 pp.).
Harlan, Robert D., Mar. 7, 2008 Advisory Action from U.S. Appl. No. 10/791,177 (3 pp.).
Le, Hoa T., Dec. 14, 2004 Office Action from U.S. Appl. No. 10/791,491 (5 pp.).
Le, Hoa T., Jul. 5, 2005 Office Action from U.S. Appl. No. 10/791,491 (9 pp.).
Kiliman, Leszak B., May 15, 2007 Advisory Action from U.S. Appl. No. 10/817,995 (2 pp.).
Mullis, Jeffrey C., Nov. 5, 2008 Advisory Action from U.S. Appl. No. 11/050,115 (4 pp.).
Sykes, Altrev C., Oct. 16, 2009 Office Action from U.S. Appl. No. 11/818,023 (20 pp.).
Haider, Saira Bano, Mar. 19, 2008 Advisory Action from U.S. Appl. No. 11/104,759 (3 pp.).
Haider, Saira Bano, Dec. 2, 2008 Office Action from U.S. Appl. No. 11/104,759 (10 pp.).
Lipman, Bernard, Sep. 14, 2006 Office Action from U.S. Appl. No. 11/168,297 (4 pp.).

(56) References Cited

OTHER PUBLICATIONS

Lipman, Bernard, Mar. 20, 2008 Office Action from U.S. Appl. No. 11/764,607 (4 pp.).
Russell, Graham, Nov. 4, 2008 Office Action from European Application No. 05742316.2 (2 pp.).
Schutte, M., Nov. 13, 2003 International Search Report from PCT Application No. PCT/US02/31817 (3 pp.).
Schutte, M., May 28, 2004 International Search Report from PCT Application No. PCT/US03/40375 (3 pp.).
Iraegui Retolaza, E., Jul. 9, 2004 International Search Report from PCT Application No. PCT/US2004/001000 (3 pp.).
Russell, G., Aug. 1, 2005 International Search Report from PCT Application No. PCT/US2005/010352 (3 pp.).
Harlan, Robert D., Dec. 10, 2008 Final Office Action from U.S. Appl. No. 10/791,177 (8 pp.).
Cain, Edward J., Dec. 9, 2008 Final Office Action from U.S. Appl. No. 11/642,795 (6 pp.).
Mulcahy, Peter D., Dec. 11, 2008 Restriction/Election Office Action from U.S. Appl. No. 11/642,802 (7 pp.).
Harlan, Robert D., Jan. 9, 2009 Office Action from U.S. Appl. No. 11/117,981 (6 pp.).
Zemel, Irina Sopja, Jan. 22, 2009 Advisory Action from U.S. Appl. No. 11/305,279 (2 pp.).
Johnson, Edward M., Dec. 12, 2008 International Search Report from PCT Application No. PCT/US2007/074611 (5 pp.).
Lipman, Bernard, Jan. 28, 2009 Notice of Allowance from U.S. Appl. No. 11/305,281 (5 pp.).
Lipman, Bernard, Jan. 27, 2009 Notice of Allowance from U.S. Appl. No. 11/764,607 (4 pp.).
Mullis, Jeffrey C., Feb. 25, 2009 Office Action from U.S. Appl. No. 11/050,115 (8 pp.).
Cain, Edward J., Feb. 23, 2009 Notice of Allowance from U.S. Appl. No. 11/642,795 (5 pp.).
Haider, Saira Bano, Mar. 3, 2009 Advisory Action from U.S. Appl. No. 11/104,759 (3 pp.).
Mullis, Jeffrey C., Mar. 11, 2009 Office Action from U.S. Appl. No. 10/791,049 (9 pp.).
Harlan, Robert D., Mar. 11, 2009 Notice of Allowance from U.S. Appl. No. 10/791,177 (8 pp.).
Kiliman, Leszek B., Mar. 19, 2009 Office Action from U.S. Appl. No. 10/817,995 (5 pp.).
Sykes, Altrev C., Mar. 20, 2009 Office Action from U.S. Appl. No. 11/818,023 (27 pp.).
Pak, Hannah J., Apr. 2, 2009 Office Action from U.S. Appl. No. 11/941,128 (9 pp.).
Harlan, Robert D., Apr. 30, 2009 Office Action from U.S. Appl. No. 11/117,981 (7 pp.).
Mullis, Jeffrey C., Apr. 30, 2009 Final Office Action from U.S. Appl. No. 11/641,514 (11 pp.).
Mulcahy, Peter D., May 13, 2009 Office Action from U.S. Appl. No. 11/642,802 (7 pp.).
Wang, Xiaorong et al., "Dispersing hairy nanoparticles in polymer melts", Polmer, vol. 49, pp. 5683-5691 (Nov. 1, 2008) [cite in appins filed after publn date].
Peets, Monique R., May 11, 2009 Restriction/Election Office Action from U.S. Appl. No. 11/697,801 (6 pp.).
Mullis, Jeffrey C., May 19, 2009 Advisory Action from U.S. Appl. No. 10/791,049 (5 pp.).
Zemel, Irina Sopja, May 28, 2009 Office Action from U.S. Appl. No. 11/305,279 (7 pp.).
Mullis, Jeffrey C., Jul. 15, 2009 Advisory Action from U.S. Appl. No. 11/641,514 (4 pp.).
Peets, Monique R., Jul. 20, 2009 Office Action from U.S. Appl. No. 11/697,801 (9 pp.).
Cussac, Yolaine, Jun. 24, 2009 International Preliminary Report on Patentability from PCT Application No. PCT/US2007/026031 (7 pp.).
Haider, Saira Bano, Sep. 11, 2009 Examiner's Answer from U.S. Appl. No. 11/104,759 (9 pp.).
Harlan, Robert D., Sep. 29, 2009 Final Office Action from U.S. Appl. No. 11/117,981 (6 pp.).
Harlan, Robert D., Oct. 18, 2007 Office Action from U.S. Appl. No. 10/791,177 (6 pp.).
Harlan, Robert D., May 28, 2008 Office Action from U.S. Appl. No. 10/791,177 (8 pp.).
Kiliman, Leszek B., Sep. 9, 2005 Office Action from U.S. Appl. No. 10/817,995 (7 pp.).
Kiliman, Leszek B., Mar. 23, 2006 Office Action from U.S. Appl. No. 10/817,995 (7 pp.).
Kiliman, Leszek B., Dec. 13, 2006 Office Action from U.S. Appl. No. 10/817,995 (6 pp.).
Kiliman, Leszek B., Sep. 5, 2008 Office Action from U.S. Appl. No. 10/817,995 (5 pp.).
Wyrozebski Lee, Katarzyna I., Dec. 19, 2006 Office Action from U.S. Appl. No. 10/872,731 (6 pp.).
Wyrozebski Lee, Katarzyna I., Mar. 7, 2007 Office Action from U.S. Appl. No. 10/872,731 (13 pp.).
Wyrozebski Lee, Katarzyna I., Sep. 14, 2007 Office Action from U.S. Appl. No. 10/872,731 (9 pp.).
Chevalier, Alicia Ann, Sep. 6, 2006 Office Action from U.S. Appl. No. 10/886,283 (5 pp.).
Chevalier, Alicia Ann, Jan. 4, 2007 Office Action from U.S. Appl. No. 10/886,283 (8 pp.).
Chevalier, Alicia Ann, Jul. 2, 2007 Office Action from U.S. Appl. No. 10/886,283 (8 pp.).
Chevalier, Alicia Ann, Jan. 4, 2008 Office Action from U.S. Appl. No. 10/886,283 (8 pp.).
Mullis, Jeffrey C., Oct. 31, 2006 Office Action from U.S. Appl. No. 11/050,115 (6 pp.).
Mullis, Jeffrey C., Mar. 24, 2008 Office Action from U.S. Appl. No. 11/050,115 (10 pp.).
Mullis, Jeffrey C., Aug. 21, 2008 Office Action from U.S. Appl. No. 11/050,115 (7 pp.).
Lipman, Bernard., Sep. 29, 2006 Office Action from U.S. Appl. No. 11/058,156 (5 pp.).
Raza, Saira B., Oct. 20, 2005 Office Action from U.S. Appl. No. 11/104,759 (10 pp.).
Raza, Saira B., Aug. 21, 2006 Office Action from U.S. Appl. No. 11/104,759 (6 pp.).
Haider, Saira Bano, May 16, 2007 Office Action from U.S. Appl. No. 11/104,759 (9 pp.).
Haider, Saira Bano, Oct. 30, 2007 Office Action from U.S. Appl. No. 11/104,759 (9 pp.).
Haider, Saira Bano, Jun. 12, 2008 Office Action from U.S. Appl. No. 11/104,759 (10 pp.).
Harlan, Robert D., Nov. 7, 2005 Office Action from U.S. Appl. No. 11/117,981 (7 pp.).
Harlan, Robert D., Jul. 20, 2006 Office Action from U.S. Appl. No. 11/117,981 (6 pp.).
Harlan, Robert D., Jan. 26, 2007 Office Action from U.S. Appl. No. 11/117,981 (8 pp.).
Harlan, Robert D., Jul. 12, 2007 Office Action from U.S. Appl. No. 11/117,981 (6 pp.).
Harlan, Robert D., Jan. 2, 2008 Office Action from U.S. Appl. No. 11/117,981 (6 pp.).
Harlan, Robert D., Jul. 25, 2008 Office Action from U.S. Appl. No. 11/117,981 (8 pp.).
Maksymonko, John M., Feb. 20, 2008 Office Action from U.S. Appl. No. 11/305,279 (14 pp.).
Maksymonko, John M., Aug. 6, 2008 Office Action from U.S. Appl. No. 11/305,279 (11 pp.).
Maksymonko, John M., Jul. 17, 2008 Office Action from U.S. Appl. No. 11/305,281 (13 pp.).
Le, Hoa T., Sep. 25, 2008 Office Action from U.S. Appl. No. 11/612,554 (8 pp.).
Maksymonko, John M., Jun. 13, 2008 Office Action from U.S. Appl. No. 11/641,514 (7 pp.).
Mullis, Jeffrey C., Oct. 31, 2008 Office Action from U.S. Appl. No. 11/641,514 (10 pp.).
Maksymonko, John M., Jun. 11, 2008 Office Action from U.S. Appl. No. 11/642,124 (16 pp.).

(56) References Cited

OTHER PUBLICATIONS

Maksymonko, John M., May 30, 2008 Office Action from U.S. Appl. No. 11/642,795 (12 pp.).
Maksymonko, John M., May 28, 2008 Office Action from U.S. Appl. No. 11/642,802 (10 pp.).
Chen, Jizhuang, Dec. 30, 2005 Office Action from Chinese Application No. 02819527.2 (9 pp.).
Chen, Jizhuang, Dec. 21, 2007 Office Action from Chinese Application No. 02819527.2 (12 pp.).
Chen, Jizhuang, Sep. 26, 2008 Office Action from Chinese Application No. 02819527.2 (4 pp.).
Schutte, M., Aug. 8, 2006 Office Action from European Application No. 02807196.7 (5 pp.).
Schutte, Maya, Sep. 3, 2007 Office Action from European Application No. 02807196.7 (2 pp.).
Watanabe, Y., May 7, 2008 Office Action from Japanese Application No. 582224/2003 (5 pp.).
Watanabe, Y., Jul. 29, 2008 Office Action from Japanese Application No. 582224/2003 (17 pp.).
Iraegui Retolaza, E, May 30, 2008 International Search Report from PCT Application No. PCT/US2007/026031 (4 pp.).
Mettler, Rolf-Martin, May 27, 2008 International Search Report from PCT Application No. PCT/US2007/087869 (2 pp.).
Hammon, Andrew, Aug. 25, 2008 International Search Report from PCT Application No. PCT/US2008/068838 (4 pp.).
Kiliman, Leszek B., Feb. 13, 2003 Office Action from U.S. Appl. No. 10/038,748 (3 pp.).
Harlan, Robert D., Mar. 17, 2004 Restriction/Election Office Action from U.S. Appl. No. 10/223,393 (6 pp.).
Harlan, Robert D., Jun. 22, 2004 Office Action from U.S. Appl. No. 10/223,393 (6 pp.).
Mullis, Jeffrey C., Nov. 9, 2009 Office Action from U.S. Appl. No. 11/641,514 (9 pp.).
Mulcahy, Peter D., Nov. 9, 2009 Final Office Action from U.S. Appl. No. 11/642,802 (6 pp.).
Kiliman, Leszek B., Nov. 13, 2009 Office Action from U.S. Appl. No. 10/817,995 (6 pp.).
Chevalier, Alicia Ann, Nov. 25, 2009 Office Action from U.S. Appl. No. 10/886,283 (7 pp.).
Zemel, Irina Sopja, Dec. 3, 2009 Final Office Action from U.S. Appl. No. 11/305,279 (10 pp.).
Peets, Monique R., Jan. 5, 2010 Final Office Action from U.S. Appl. No. 11/697,801 (9 pp.).
Pak, Hannah J., Jan. 6, 2010 Final Office Action from U.S. Appl. No. 11/941,128 (10 pp.).
Harlan, Robert D., Dec. 28, 2009 Office Action from U.S. Appl. No. 12/504,255 (6 pp.).
Wheeler, Thurman Michael, Feb. 8, 2010 Office Action from U.S. Appl. No. 11/642,796 (13 pp.).
Powers, P.O., "Solubility of Polystyrene Fractions in Hydrocarbons", Industrial and Engineering Chemistry, vol. 42, No. 12, pp. 2558-2562 [Dec. 1950].
Mullis, Jeffrey C., Mar. 3, 2010 Restriction/Election Office Action from U.S. Appl. No. 11/771,659 (7 pp.).
Sykes, Altrev C., Apr. 5, 2010 Final Office Action from U.S. Appl. No. 11/818,023 (24 pp.).
Chevalier, Alicia Ann, May 3, 2010 Final Office Action from U.S. Appl. No. 10/886,283 (8 pp.).
Harlan, Robert D., May 13, 2010 Final Office Action from U.S. Appl. No. 12/504,255 (7 pp.).
Mullis, Jeffrey C., May 26, 2010 Final Office Action from U.S. Appl. No. 11/641,514 (8 pp.).
Ducheneaux, Frank D., Jun. 8, 2010 Office Action from U.S. Appl. No. 10/817,995 (19 pp.).
Harlan, Robert D., Jun. 9, 2010 Office Action from U.S. Appl. No. 12/504,255 (6 pp.).
Chevalier, Alicia Ann, Jul. 8, 2010 Advisory Action from U.S. Appl. No. 10/886,283 (3 pp.).
Wheeler, Thurman Michael, Jul. 30, 2010 Final Office Action from U.S. Appl. No. 11/642,796 (15 pp.).
Mullis, Jeffrey C., Aug. 12, 2010 Advisory Action from U.S. Appl. No. 11/641,514 (4 pp.).
Bradley, Melanie et al., "Poly(vinylpyridine) Core/Poly(N-isoproplacrylamide) Shell Microgel Particles: Their Characterization and the Uptake and Release of an Anionic Surfactant", Langmuir, vol. 24, pp. 2421-2425 (Mar. 14, 2008).
Park, Jong Chul, Aug. 3, 2010 International Search Report from PCT Application No. PCT/US2009/069680 (3 pp.).
Mensah, Laure, Sep. 20, 2010 Office Action from European Application No. 07813483.0 (4 pp.).
Egwim, Kelechi Chidi, Sep. 30, 2010 Office Action from U.S. Appl. No. 12/047,896 (6 pp.).
Syes, Altrev C., Oct. 22, 2010 Advisory Action from U.S. Appl. No. 11/818,023 (2 pp.).
Sykes, Altrev C., Oct. 29, 2010 Examiner's Answer from U.S. Appl. No. 11/818,023 (25 pp.).
Chevalier, Alicia Ann, Nov. 23, 2010 Office Action from U.S. Appl. No. 10/886,283 (6 pp.).
Ducheneaux, Frank D., Dec. 28, 2010 Final Office Action from U.S. Appl. No. 10/817,995 (24 pp.).
Haider, Saira Bano, Feb. 9, 2011 Decision on Appeal from U.S. Appl. No. 11/104,759 (4 pp.).
Egwim, Kelechi Chidi, Mar. 21, 2011 Final Office Action from U.S. Appl. No. 12/047,896 (6 pp.).
Mullis, Jeffrey C., Mar. 30, 2011 Decision on Appeal from U.S. Appl. No. 10/791,049 (7 pp.).
Ducheneaux, Frank D., Apr. 4, 2011 Advisory Action from U.S. Appl. No. 10/817,995 (6 pp.).
Brovkina, T.A., English translation of May 4, 2011 Office Action from Russian Application No. 2009107218 (7 pp.).
Mullis, Jeffrey C., May 23, 2011 Office Action from U.S. Appl. No. 12/288,174 (6 pp.).
Wheeler, Thurman Michael, May 31, 2011 Office Action from U.S. Appl. No. 11/642,796 (12 pp.).
Mullis, Jeffrey C., Jun. 3, 2011 Restriction/Election Office Action from U.S. Appl. No. 12/374,883 (7 pp.).
Egwim, Kelechi Chidi, Jun. 13, 2011 Advisory Action from U.S. Appl. No. 12/047,896 (2 pp.).
Xia, Lanying, Jul. 6, 2011 Office Action with English translation from Chinese Application No. 200780047895.2 (8 pp.).
Mullis, Jeffrey C., Jul. 27, 2011 Office Action from U.S. Appl. No. 12/374,883 (13 pp.).
Brovkina, T.A., Oct. 12, 2011 Office Action with English translation from Russian Application No. 2009107218 (8 pp.).
Fink, Brieann R., Dec. 1, 2011 Office Action from U.S. Appl. No. 12/754,367 (15 pp.).
Mullis, Jeffrey C., Feb. 1, 2012 Office Action from U.S. Appl. No. 12/374,883 (9 pp.).
Zemel, Irina Sopja, Apr. 30, 2012 Decision on Appeal from U.S. Appl. No. 11/305,279 (12 pp.).
Robertson, C.G. et al., "Effect of structural arrest on Poisson's ratio in nanoreinforced elastomers," Physical Review E, vol. 75, pp. 051403-1 thru 051403-7 (2007).
Walther, Andreas et al., "Engineering Nanostructured Polymer Blends with Controlled Nanoparticle Location using Janus Particles," ACS Nano., 2(6), pp. 1167-1178 (2008).
Cheng, Lin et al., "Efficient Synthesis of Unimolecular Polymeric Janus Nanoparticles and Their Unique Self-Assembly Behavior in a Common Solvent," Macromolecules, 41, pp. 8159-8166 (2008).
Wang, Chun Cheng, May 4, 2012 Office Action from U.S. Appl. No. 12/555,183 (9 pp.).
Schacher, Felix et al., "Multicompartment Core Micelles of Triblock Terpolymers in Organic Media," Macromolecules, 42, pp. 3540-3548 (2009).
Walther, Andreas et al., "Janus Particles," Soft Matter, 4, pp. 663-668 (2008).
Zhao, Bin et al., "Mixed Polymer Brush-Grafted Particles: A New Class of Environmentally Responsive Nanostructured Materials," Macromolecules, 42, pp. 9369-9383 (2009).
Peets, Monique R., Jul. 10, 2014 Office Action from U.S. Appl. No. 12/979,719 (7 pp.).
Sardjoe, Irene, Sep. 4, 2014 Oral Proceedings Minutes from EP Application No. 07813483.0 (6 pp.).

(56) References Cited

OTHER PUBLICATIONS

Chinese Patent Office, Oct. 8, 2014 Notice of Reexamination from Chinese Application No. 200780036040.X (32 pp.).
Fink, Brieann R., Oct. 23, 2014 Office Action from U.S. Appl. No. 12/754,367 (21 pp.).
Zemel, Irina Sopja, Oct. 30, 2014 Final Office Action from U.S. Appl. No. 11/305,279 (7 pp.).
Nakamura, E., Dec. 2, 2014 Office Action with English translation from Japanese Application No. 2009-522021 (6 pp.).
Sykes, Altrev C., Dec. 19, 2014 Final Office Action from U.S. Appl. No. 11/818,023 (14 pp.).
Korean Patent Office, Jan. 14, 2015 Office Action with English translation from Korean Application No. 10-2010-7001987 (5 pp.).
Kaucher, Mark S., Apr. 28, 2015 Office Action from U.S. Appl. No. 14/499,895 (14 pp.).
Chinese Patent Office, May 6, 2015 Office Action from 200780036040.X (9 pp.).
Kaucher, Mark S., Oct. 16, 2015 Final Office Action from U.S. Appl. No. 14/499,895 (17 pp.).
Okazaki, Tadashi, Aug. 18, 2015 Office Action with English translation from Japanese Application No. 2014-189797 (11 pp.).
KIPO, Jul. 30, 2015 Office Action with English translation from Korean Application No. 10-2011-7017864 (6 pp.).
Fink, Brieann R., Sep. 30, 2015 Office Action from U.S. Appl. No. 14/746,142 (10 pp.).
Pitt Quantum Repository, "Maleimide", Retrieved At: <<http://pqr.pitt.edu/mol/PEEHTFAAVSWFBL-UHFFFAOYSA-N/, Retrieved Date: Sep. 24, 2015, 2 pages.
Okazaki, Tadashi,Nov. 10, 2015 Office Action with English translation from Japanese Application No. 2014-189797 (6 pp.).
Nakamura, E., May 19, 2015 Pre-appeal Examination Report with English translation from Japanese Application No. 2009-522021 (2 pp.).
Kaucher, Mark S., "Non-Final Office Action for U.S. Appl. No. 14/499,895", dated Mar. 10, 2016, 18 pages.
Kawaguchi, Haruma, "Functional Polymer Microspheres", In Prog. Polym. Sci., vol. 25, Elsevier Science Ltd., Jun. 30, 2000, pp. 1171-1210.
Mettler, Rolf-Martin, "Communication Pursuant to Article 94(3) EPC for European Patent Application No. 07865780.6", dated Dec. 17, 2015, 4 pages.
Lipman, Bernard, May 21, 2007 Notice of Allowance from U.S. Appl. No. 11/058,156 (3 pp.).
Grinsted, Ronald, Apr. 20, 2015 Restriction Requirement from U.S. Appl. No. 13/731,666 (7 pp.).
Grinsted, Ronald, Jul. 15, 2015 Office Action from U.S. Appl. No. 13/731,666 (8 pp.).
Kotani, Marina et al., "Characterization of Carbon Filler Distribution Ratio in Polyisoprene/Polybutadiene Rubber Blends by High-Resolution Solid-State 13C NMR," Macromolecules, vol. 40, pp. 9451-9454 (2007).
Grinsted, Ronald, "Ex Parte Quayle Action for U.S. Appl. No. 13/731,666", dated Dec. 31, 2015, 5 pages.
Grinsted, Ronald, "Notice of Allowance for U.S. Appl. No. 13/731,666", dated Mar. 14, 2016, 10 pages.
Grinsted, Ronald, "Notice of Allowance for U.S. Appl. No. 13/731,666", dated Apr. 25, 2016, 9 pages.
Koyanagi, K..., "Office Action for Japanese Patent Application No. 2009-522021", dated Aug. 30, 2016, 13 pages.
Kaucher, Mark S., "Final Office Action for U.S. Appl. No. 14/499,895", dated Aug. 17, 2016, 9 pages.
Bandrup, et al., "The Polymer Handbook", Fourth Edition, 1999, 32 pages.
Lewis, Nathan T., "Response to the Restriction Requirement for U.S. Appl. No. 13/731,666", Filed Date: Jun. 22, 2015, 7 pages.
Lewis, Nathan T., "Response to the Office Action for U.S. Appl. No. 13/731,666", Filed Date: Nov. 16, 2015, 8 pages.
Lewis, Nathan T., "Response to the Final Office Action for U.S. Appl. No. 13/731,666", Filed Date: Feb. 29, 2016, 5 pages.

Lewis, Nathan T., "Amendment After Notice of Allowance for U.S. Appl. No. 13/731,666", Filed Date: May 11, 2016, 3 pages.
Zhang, Jian et al., "Bioconjugated Janus Particles Prepared by in Situ Click Chemistry," Chemistry of Materials, 21, pp. 4012-4018 (2009).
Dendukuri, Dhananjay et al., "Synthesis and Self-Assembly of Amphiphilic Polymeric Microparticles," Langmuir, 23, pp. 4669-4674 (2007).
Berger, Sebastian et al., "Stimuli-Responsive Bicomponent Polymer Janus Particles by 'Grafting from'/ 'Grafting to' Approaches," Macromolecules, 41, pp. 9669-9676 (2008).
The Dow Chemical Company, "DVB Cross-link a variety of materials for improved thermal, physical, and chemical properties," 44 pp. (Jan. 2003).
Mulcahy, Peter D., Nov. 9, 2011 Office Action from U.S. Appl. No. 11/642,802 (6 pp.).
Wang, Y. et al., "Janus-Like Polymer Particles Prepared Via Internal Phase Separation from Emulsified Polymer/Oil Droplets," Polymer, vol. 50, No. 14, pp. 3361-3369 (2009).
Chinese Patent Office, Nov. 3, 2011 Office Action with English translation from Chinese Application No. 200780036040.X (12 pp.).
Hofler, Thomas, May 22, 2012 Supplementary European Search Report with Search Opinion from European Application No. 09837105.7 (5 pp.).
Watanabe, Yoko, May 22, 2012 Office Action with English translation from Japanese Application No. 2008-248866 (5 pp.).
Fink, Brieann R., Jun. 6, 2012 Final Office Action from U.S. Appl. No. 12/754,367 (13 pp.).
Tsitsilianis, Constantinos, "Phase Behavior of Heteroarm Star Copolymers by Differential Scanning Calorimetry," Macromolecules, 26, pp. 2977-2980 (1993).
Malashkova, E.S., Jun. 1, 2012 Office Action with English translation from Russian Application No. 2010102943 (10 pp.).
Adams, Donald E. et al., Jun. 18, 2012 Decision on Appeal from U.S. Appl. No. 11/818,023 (13 pp.).
Wheeler, Thurman Michael, Nov. 6, 2012 Office Action from U.S. Appl. No. 11/642,796 (14 pp.).
Kaucher, Mark S., Nov. 5, 2012 Office Action from U.S. Appl. No. 12/979,732 (24 pp.).
Mullis, Jeffrey C., Feb. 9, 2011 Restriction/Election Office Action from U.S. Appl. No. 12/288,174 (8 pp.).
Sykes, Altrev C., Nov. 8, 2012 Final Office Action from U.S. Appl. No. 11/818,023 (20 pp.).
Mulcahy, Peter D., Dec. 6, 2012 Final Office Action from U.S. Appl. No. 11/642,802 (8 pp.).
Kaucher, Mark S., Dec. 18, 2012 Office Action from U.S. Appl. No. 13/142,770 (19 pp.).
Nakamura, Eiji, Mar. 26, 2013 Office Action with English translation from Japanese Application No. 2009-522021 (9 pp.).
Giesemann, Gerhard, Apr. 8, 2013 Office Action from European Application No. 08772275.7 (4 pp.).
Peets, Monique R., Apr. 11, 2013 Office Action from U.S. Appl. No. 12/979,719 (6 pp.).
Inoue, M., Jun. 4, 2013 Office Action with English translation from Japanese Application No. 2009-543130 (6 pp.).
Chinese Patent Office, Jun. 28, 2013 Office Action with English translation from Chinese Application No. 200980157756.4 (13 pp.).
Wheeler, Thurman Michael, Jul. 5, 2013 Final Office Action from U.S. Appl. No. 11/642,796 (10 pp.).
Min, Ke et al., "Atom Transfer Radical Dispersion Polymerization of Styrene in Ethanol," Macromolecules, vol. 40, pp. 7217-7222 (2007).
Chinese Patent Office, Sep. 4, 2013 Office Action with English translation from Chinese Application No. 200780036040.X (18 pp.).
Sykes, Altrev C., Sep. 5, 2013 Office Action from U.S. Appl. No. 11/818,023 (22 pp.).
Zemel, Irina Sophia, Sep. 30, 2013 Final Office Action from U.S. Appl. No. 11/305,279 (7 pp.).
Fink, Brieann R., Sep. 30, 2013 Office Action from U.S. Appl. No. 12/754,367 (14 pp.).

(56) References Cited

OTHER PUBLICATIONS

Papadopoulos, P. et al., "Origin of Glass Transition of Poly(2-vinylpyridine). A Temperature- and Pressure-Dependent Dielectric Spectroscopy Study," Macromolecules, vol. 37, pp. 8116-8122 (2004).
Uchida, Y., Oct. 1, 2013 Office Action with English translation from Japanese Application No. 2010-515229 (9 pp.).
Peets, Monique R., Nov. 5, 2013 Final Office Action from U.S. Appl. No. 12/979,719 (9 pp.).
Russian Patent Office, Nov. 6, 2013 Office Action from Russian Application No. 2011126888 (9 pp.).
Korean Patent Office, Nov. 28, 2013 Office Action from Korean Application No. 10-2009-7004191 (7 pp.).
Chinese Patent Office, Dec. 4, 2013 Office Action from Chinese Application No. 200980157756.4 (8 pp.).
Zemel, Irina Sophia, Jan. 3, 2014 Advisory Action from U.S. Appl. No. 11/305,279 (3 pp.).
Kaucher, Mark S., Jan. 31, 2014 Final Office Action from U.S. Appl. No. 13/142,770 (8 pp.).
Schwab, F.C. et al., "Anionic Dispersion Polymerization of Styrene," Advances in Polymer Synthesis, vol. 31, pp. 381-404 (1985).
Nakamura, Eiji, Feb. 12, 2014 Office Action with English translation from Japanese Application No. 2009-522021 (11 pp.).
Sykes, Altrev C., Feb. 14, 2014 Final Office Action from U.S. Appl. No. 11/818,023 (26 pp.).
Korean Patent Office, Feb. 27, 2014 Office Action with English translation from Korean Application No. 10-2009-7014949 (10 pp.).
Peets, Monique R., Mar. 11, 2014 Final Office Action from U.S. Appl. No. 12/979,719 (9 pp.).
Awan, M.A. et al., "Anionic Dispersion Polymerization of Styrene. I. Investigation of Parameters for Preparation of Uniform Micron-Size Polystyrene Particles with Narrow Molecular Weight Distribution," Journal of Polymer Science: Part A: Polymer Chemistry, vol. 34, pp. 2633-2649 (1996).
Uchida, Y., Apr. 15, 2014 Office Action with English translation from Japanese Application No. 2010-515229 (6 pp.).
Fink, Brieann R., Apr. 23, 2014 Office Action from U.S. Appl. No. 12/754,367 (30 pp.).
Kaucher, Mark S., May 19, 2014 Notice of Allowance from U.S. Appl. No. 13/142,770 (4 pp.).
Okazaki, Tadashi, May 20, 2014 Office Action with English translation from Japanese Application No. 2011-544583 (9 pp.).
Zemel, Irina Sopjia, Jun. 6, 2014 Office Action from U.S. Appl. No. 11/305,279 (10 pp.).
Skes, Altrev C., Jun. 20, 2014 Office Action from U.S. Appl. No. 11/818,023 (21 pp.).
Zilliox, Jean-Georges et al., "Preparation de Macromolecules a Structure en Etoile, par Copolymerisation Anionique", J. Polymer Sci.: Part C, No. 22, pp. 145-156 (1968).
Bohm, Georg et al., "Emerging materials: technology for new tires and other rubber products", Tire Technology International, 2006 (4 pp.).
Cui, Honggang et al., "Block Copolymer Assembly via Kinetic Control", Science, vol. 317, pp. 647-650 (Aug. 3, 2007).
Edmonds, William F. et al., "Disk Micelles from Nonionic Coil—Coil Diblock Copolymers", Macromolecules, vol. 39, pp. 4526-4530 (May 28, 2006).
Wang, Xiaorong et al., "Strain-induced nonlinearity of filled rubbers", Physical Review E 72, 031406, pp. 1-9 (Sep. 20, 2005).
Pre-print article, Wang, Xiaorong et al., "PMSE 392—Manufacture and Commercial Uses of Polymeric Nanoparticles", Division of Polymeric Materials: Science and Engineering (Mar. 2006).
Wang, Xiaorong et al., "Manufacture and Commercial Uses of Polymeric Nanoparticles", Polymeric Materials: Science and Engineering, vol. 94, p. 659 (2006).
Wang, Xr. et al., "Fluctuations and critical phenomena of a filled elastomer under deformation", Europhysics Letters, vol. 75, No. 4, pp. 590-596 (Aug. 15, 2006).

Wang, Xiaorong et al., "Under microscopes the poly(styrene/butadiene) nanoparticles", Journal of Electron Microscopy, vol. 56, No. 6, pp. 209-216 (2007).
Wang, Xiaorong et al., "Heterogeneity of structural relaxation in a particle-suspension system", EPL, 79, 18001, pp. 1-5 (Jul. 2007).
Bridgestone Americas 2006 Presentation (14 pp.).
Borukhov, Itamar et al., "Enthalpic Stabilization of Brush-Coated Particles in a Polymer Melt", Macromolecules, vol. 35, pp. 5171-5182 (2002).
Braun, Hartmut et al., "Enthalpic interaction of diblock copolymers with immiscible polymer blend components", Polymer Bulletin, vol. 32, pp. 241-248 (1994).
Brown, H.R. et al., "Communications to the Editor: Enthalpy-Driven Swelling of a Polymer Brush", Macromolecules, vol. 23, pp. 3383-3385 (1990).
Cahn, John W., "Phase Separation by Spinodal Decomposition in Isotropic Systems", The Journal of Chemical Physics, vol. 42, No. 1, pp. 93-99 (Jan. 1, 1965).
Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).
Ferreira, Paula G. et al., "Scaling Law for Entropic Effects at Interfaces between Grafted Layers and Polymer Melts", Macromolecules, vol. 31, pp. 3994-4003 (1998).
Gay, C., "Wetting of a Polymer Brush by a Chemically Identical Polymer Melt", Macromolecules, vol. 30, pp. 5939-5943 (1997).
Halperin, A., "Polymeric Micelles: A Star Model", Macromolecules, vol. 20, pp. 2943-2946 (1987).
Hasegawa, Ryuichi et al., "Optimum Graft Density for Dispersing Particles in Polymer Melts", Macromolecules, vol. 29, pp. 6656-6662 (1996).
Kraus, Gerard, "Mechanical Losses in Carbon-Black-Filled Rubbers", Journal of Applied Polymer Science: Applied Polymer Symposium, vol. 39, pp. 75-92 (1984).
Ligoure, Christian, "Adhesion between a Polymer Brush and an Elastomer: A Self-Consistent Mean Field Model", Macromolecules, vol. 29, pp. 5459-5468 (1996).
Matsen, M.W., "Phase Behavior of Block Copolymer/Homopolymer Blends", Macromolecules, vol. 28, pp. 5765-5773 (1995).
Milner, S.T. et al., "Theory of the Grafted Polymer Brush", Macromolecules, vol. 21, pp. 2610-2619 (1988).
Milner, S.T. et al., "End-Confined Polymers: Corrections to the Newtonian Limit", Macromolecules, vol. 22, pp. 489-490 (1989).
Noolandi, Jaan et al., "Theory of Block Copolymer Micelles in Solution", Macromolecules, vol. 16, pp. 1443-1448 (1983).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).
Shull, Kenneth R., "End-Adsorbed Polymer Brushes in High- and Low-Molecular-Weight Matrices", Macromolecules, vol. 29, pp. 2659-2666 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Witten, T.A. et al., "Stress Relaxation in the Lamellar Copolymer Mesophase", Macromolecules, vol. 23, pp. 824-829 (1990).
Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

(56) References Cited

OTHER PUBLICATIONS

Ishizu, Koji et al., "Preparation of core-shell type polymer microspheres from anionic block copolymers", Polymer, vol. 34, No. 18, pp. 3929-3933 (1993).
Saito, Reiko et al., "Core-Shell Type Polymer Microspheres Prepared From Poly(Styrene-b-Methacrylic Acid)-1. Synthesis of Microgel", Eur. Polym. J., vol. 27, No. 10, pp. 1153-1159 (1991).
Saito, Reiko et al., "Arm-number effect of core-shell type polymer microsphere: 1. Control of arm-number of microsphere", Polymer, vol. 35, No. 4, pp. 866-871 (1994).
O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).
Ma, Hongyang et al., "Reverse Atom Transfer Radical Polymerization of Methyl Methacrylate in Room-Temperature Ionic Liquids", Journal of Polymer Science: Part A: Polymer Chemistry, 41, pp. 143-151 (2003).
Kralik, M. et al., "Catalysis by metal nanoparticles supported on functional organic polymers", Journal of Molecular Catalysis A: Chemical, vol. 177, pp. 113-138 [2001].
Wang, Xiaorong et al., U.S. Appl. No. 12/184895 filed Aug. 1, 2008 entitled "Disk-Like Nanoparticles".
Sakurai, Ryo et al., "68.2: Color and Flexible Electronic Paper Display using QR-LPD Technology", SID 06 Digest, pp. 1922-1925 (2006).
Asinovsky, Olga, Jun. 20, 2006 Office Action from U.S. Appl. No. 10/791,049 (11 pp.).
Asinovsky, Olga, Dec. 22, 2006 Office Action from U.S. Appl. No. 10/791,049 (11 pp.).
Asinovsky, Olga, Jun. 7, 2007 Office Action from U.S. Appl. No. 10/791,049 (11 pp.).
Asinovsky, Olga, Nov. 28, 2007 Office Action from U.S. Appl. No. 10/791,049 (9 pp.).
Asinovsky, Olga, May 21, 2008 Office Action from U.S. Appl. No. 10/791,049 (11 pp.).
Asinovsky, Olga, Sep. 11, 2008 Office Action from U.S. Appl. No. 10/791,049 (12 pp.).
Ronesi, Vickey M., Jan. 8, 2007 Office Action from U.S. Appl. No. 10/791,177 (5 pp.).
Harlan, Robert D., May 3, 2007 Office Action from U.S. Appl. No. 10/791,177 (6 pp.).
Newkome George R. et al., "Dendrimers and Dendrons: Concept, Synthesis, Application", WILEY-VCH Verlag GmbH, pp. 45, 191-310 (2001).
Simmons, Blake et al., "Templating Nanostructure trhough the Self-Assembly of Surfactants", Synthesis, Functionalization and Surface Treatment of Nanoparticles, ASP (Am.Sci.Pub.), pp. 51-52, 174-208 (2003).
Hay, J.N. et al., "A Review of Nanocomposites," 15 pp. (2000).
Tuzar et al., "Anomalous Behaviour of Solutions of Styrene-Butadiene Block Copolymers in Some Solvents", Makromol. Chem. 178, 22743-2746 (1977).
Mandema et al., "Association of Block Copolymers in Selective Solvents, 1 Measurements on Hydrogenated Poly (styrene-isoprene) in Decane and in trans-Decalin", Makromol. Chem. 180, pp. 1521-1538 (1979).
Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).
Tomalia, Donald A. et al., "Dendritic Macromolecules: Synthesis of Starburst Dendrimers", Macromolecules vol. 19, No. 9, pp. 2466-2468 (1986).
Jensen, M. et al., "EXAFS Investigations of the Mechanism of Facilitated Ion Transfer into a Room-Temperature Ionic Liquid", J. Am. Chem. Soc., 124, pp. 10664-10665 (2002).
Canham et al., "Formation of Worm-like Micelles from a Polystyrene-Polybutadiene-Polystyrene Block Copolymer in Ethyl Acetate", J.C.S. Faraday I, 76, 1857-1867 (1980).

Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737.
Greenwood, N.N. et al., Chemistry of the Elements, Pergaroen Press, New York, pp. 1126-1127 (1984).
Lagaly, Gehard, "Kink-Block and Gauche-Block Structures of Bimolecular Films", Chem. Int. Ed. Engl., vol. 15, No. 10, pp. 575-586 (1976).
Utiyama et al., "Light-Scattering Studies of a Polystyrene-Poly(methyl methacrylate) Two-Blcok Copolymer in Mixed Solvents", Macromolecules, vol. 7, No. 4, (Jul.-Aug. 1974).
Ren, Jiaxiang et al., "Linear Viscoelasticity of Disordered Polystyrene-Polyisoprene Block Copolymer Based Layered-Silicate Nanocomposites", Macromolecules, 33, pp. 3739-3746 (2000).
Moller, Martin et al., "Mineralization of Gold in Block Copolymer Micelles", Macromol. Symp., 117, pp. 207-218 (1997).
Dieterich, W. et al., "Non-Debye Relaxations in Disordered Ionic Solids", Chem. Chys., 284, pp. 439-467 (2002).
Giannelis, E.P. "Polymer Layered Silicate Nanocomposites", Advanced Materials, vol. 8, No. 1, pp. 29-35 (Jan. 1, 1996).
Tiyapiboonchaiya, Churat et al., "Polymer-m-Ionic-Liquid Electrolytes", Macromol. Chem. Phys., 203, pp. 1906-1911 (2002).
Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).
Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).
Wiley, John, "Quaternary Ammonium Compounds", Encyclopedia of Chem Tech., 4th Ed. vol. 20, pp. 739-767 (1996).
Quirk, Roderic P. et al., "Controlled Anionic Synthesis of Polyisoprene-Poly(2-vinylpyridine) Diblock Copolymers in Hydrocarbon Solution", Macromolecules, 34, pp. 1192-1197 (2001).
Coleman, Jr. Lester E. et al., "Reaction of Primary Aliphatic Amines with Maleic Anhydride", J. Org,. Chem., 24, 185, pp. 135-136 (1959).
Gilman, Jeffrey W. et al., "Recent Advances in Flame Retardant Polymer Nanocomposites," Fire and Materials 2001, 7th International Conference and Exhibition. Proceedings, Interscience Communications Limited, San Antonio, TX, pp. 273-283, Jan. 22-24, 2001).
Krishnamoorti, Ramanan et al., "Rheology of End-Tethered Polymer Layered Silicate Nanocomposites", Macromolecules, 30, pp. 4097-4102 (1997).
Mossmer, Stefan et al., "Solution Behavior of Poly(styrene)-block-poly(2-vinylpyridine) Micelles Containing Gold Nanoparticles", Macromolecules, 33, pp. 4791-4798 (2000).
Haeussler, L. et al., "Simultaneous TA and MS Analysis of Alternating Styrene-Malei Anhydride and Styrene-Maleimide Copolymers", Thermochim. Acta, 277, 14 (1996).
lshizu, Koji, "Star Polymers by Immobilizing Functional Block Copolymers", Star and Hyperbranched Polymers, ISBN 0-8247, pp. 135-178 (1999).
Hardacre, Christopher et al., "Structure of molten 1,3-dimethylimidazolium chloride using neutron diffraction", Journal of Chemical Physics, vol. 118, No. 1, pp. 273-278 (2003).
Coulson, S.R. et al., "Super-Repellent Composite Fluoropolymer Surfaces", The Journal of Physical Chemistry B, vol. 104, No. 37, pp. 8836-8840 (Sep. 21, 2000).
Kim, Woo-Sik et al., "Synthesis and Photocrosslinking of Maleimide-Type Polymers", Macromol. Rapid Commun., 17, 835, pp. 835-841 (1996).
Matsumoto, Akikazu et al., "Synthesis, Thermal Properties and Gas Permeability of Poly (N-n-alkylmaleimide)s", Polymer Journal, vol. 23, No. 3, pp. 201-209 (1991).
Cosgrove, Terence et al., "Adsorbed Block Copolymer of Poly(2-vinylpyridine) and Polystyrene Studied by Neutron Reflectivity and Surface Force Techniques", Macromolecules, 26, pp. 4363-4367 (1993).

(56) References Cited

OTHER PUBLICATIONS

Erbil, H. Yildirim et al., "Transformation of a Simple Plastic into a Superhydrophobic Surface", Science, vol. 299, pp. 1377-1380 (Feb. 28, 2003).

Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).

Vulcanization Agents and Auxiliary Materials, Rubber Compounding, Kirk-Othmer, Encyclopedia of Chemical Technology, 3rd Ed., Wiley Interscience, NY, vol. 20. pp. 390-402 (1982).

Bahadur, Pratap, "Block copolymers—Their microdomain formation (in solid state) and surfactant behaviour (in solution)", Current Science, vol. 80, No. 8, pp. 1002-1007 (Apr. 25, 2001).

Guo, Andrew et al., "Star Polymers and Nanospheres from Cross-Linkable Diblock Copolymers", Macromolecules, vol. 29, pp. 2487-2493 (Jan. 17, 1996).

Ishizu, Koji et al., "Core-Shell Type Polymer Microspheres Prepared from Block Copolymers", Journal of Polymer Science: Part C: Polymer Letters, vol. 26, pp. 281-286 (1988).

Ishizu, Koji, "Synthesis and Structural Ordering of Core-Shell Polymer Microspheres", Prog. Polym. Sci., vol. 23, pp. 1383-1408 (1998).

O'Reilly, Rachel K. et al., "Cross-linked block copolymer micelles: functional nanostructures of great potential and versatility", Chem. Soc. Rev., vol. 35, pp. 1068-1083 (Oct. 2, 2006).

Oranli, Levent et al., "Hydrodynamic studies on micellar solutions of styrene-butadiene block copolymers in selective solvents", Can. J. Chem., vol. 63, pp. 2691-2696 (1985).

Pispas, S. et al., "Effect of Architecture on the Micellization Properties of Block Copolymers: A2B Miktoarm Stars vs AB Diblocks", Macromolecules, vol. 33, pp. 1741-1746 (Feb. 17, 2000).

Riess, Gerard, "Micellization of block copolymers", Progress in Polymer Science, vol. 28, pp. 1107-1170 (Jan. 16, 2003).

Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).

Thurmond, K. Bruce et al., "Shell cross-linked polymer micelles: stabilized assemblies with great versatility and potential", Colloids and Surfaces B: Biointerfaces, vol. 16, pp. 45-54 (1999).

Wilson, D.J. et al., "Photochemical Stabilization of Block Copolymer Micelles", Eur. Polym. J., vol. 24, No. 7, pp. 617-621 (1988).

Ege, Seyhan, Organic Chemistry Structure and Reactivity, 3rd Edition, p. 959 (1994).

Haider, Saira Bano, Dec. 22, 2006 Advisory Action from U.S. Appl. No. 11/104,759 (3 pp.).

Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

Wheeler, Thurman Michael, "Office Action for U.S. Appl. No. 14/531,445", dated Dec. 15, 2016, 7 pages.

Kaucher, Mark S., "Notice of Allowance and Fees Due for U.S. Appl. No. 14/499,895", dated Dec. 16, 2016, 8 pages.

\* cited by examiner

NANOPARTICLE FILLERS AND METHODS OF MIXING INTO ELASTOMERS

CROSS-REFERENCE TO RELATED APPLICATIONS

This application is a divisional of U.S. patent application Ser. No. 13/731,666, filed on Dec. 31, 2012, which in turn claims the benefit of priority to the U.S. provisional application having the Ser. No. 61/582,226, filed on Dec. 30, 2011. These prior applications are herein incorporated by reference for all purposes.

FIELD

This disclosure relates to nanoparticles and methods of blending them into polymeric matrices.

BACKGROUND

Various types of small particulate additives have been used in polymer compositions. For example, core-shell particles for use in plastic compositions as impact modifiers have been in use for many years. Rubber compositions may also include core-shell particles, as taught, for example, by U.S. Pat. No. 6,437,050. Living anionic polymerization methods are known for making core-shell nanoparticles. These may be formed by crosslinking polymer chains that are formed into a micelle. Furthermore, certain functionalized nanoparticles have also been synthesized.

As with any polymer composition, determining what functional groups on an additive will be useful with a particular polymer matrix is a challenge. In addition to the general unpredictability of the art, a particular challenge with functionalized polymeric nanoparticles is to maintain the stability of the particle suspension during the polymerization formation and to maintain while compounding with a polymer matrix. Furthermore, challenges are also present for efficient and thorough blending of the particles into a polymer system with uniform distribution.

Rubber polymeric matrices, in particular, may be advantageously modified by the addition of various nanoparticles. The physical properties of rubber moldability and tenacity can be improved through such additions. However, the simple indiscriminate addition of nanoparticles to rubber is likely to be inhomogeneous and cause degradation of the matrix material. Moreover, only the selection of nanoparticles having suitable size, material composition, and surface chemistry, etc., will improve the matrix characteristics. An efficient technique for blending the nanoparticles into the rubber to maximize uniform distribution is also desirable.

SUMMARY

In an embodiment a polymeric nanoparticle includes a copolymer comprising a vinyl-aromatic monomer and a heterocyclic monomer. The copolymer is crosslinked with a multifunctional crosslinking agent that is polymerizable through an addition reaction.

In another embodiment, a composition includes an elastomer and polymeric nanoparticles, wherein each polymeric nanoparticle comprises a copolymer including a vinyl-aromatic monomer and a heterocyclic monomer. The copolymer is crosslinked with a multifunctional crosslinking agent that is polymerizable through an addition reaction.

In another embodiment a method for making a composition includes the steps of: mixing, in the substantial absence of solvent, a dry elastomer; and adding to the dry elastomer and mixing, in aqueous solution, a nanoparticle latex that comprises polymerized mono-vinyl monomer-contributed units crosslinked with a multifunctional crosslinking agent that is polymerizable through an addition reaction. Optionally, an additional unsaturated elastomer that may be the same or different as the dry unsaturated elastomer is mixed in. The nanoparticles are present in a volume fraction of the composition of about 0.02 to about 0.50.

In another embodiment, a method for making a composition includes: blending (a) a polymeric nanoparticle latex comprising polymerized mono-vinyl monomer contributed units crosslinked with a multifunctional crosslinking agent that is polymerizable by means of an addition reaction into (b) an elastomer latex, thereby forming a pre-blended nanoparticle latex, and then mixing the pre-blended nanoparticle elastomer latex into a dry unsaturated elastomer.

In another embodiment, a polymeric nanoparticle composition includes nanoparticles having a polymeric core including vinyl-aromatic mono-vinyl monomer contributed units crosslinked with a multifunctional crosslinking agent polymerizable through an addition reaction. The polymeric core is essentially free of units of unsaturation and has a weight average particle diameter of about 10 to about 500 nanometers as determined by field flow fractionation on a sample swollen in THF solvent.

In another embodiment a method for making a polymeric nanoparticle composition includes: dissolving an elastomer in a solvent or providing an elastomer dissolved in solvent; mixing the elastomer in solution with an aqueous nanoparticle latex in a multi-elements static mixer to form an elastomer and nanoparticle latex mixture; then flash drying the elastomer and nanoparticle latex mixture upon exiting the mixer.

In another embodiment a method for making an elastomeric nanoparticle composition includes: mixing an elastomer with an aqueous nanoparticle latex in an intermeshing mixer; venting the intermeshing mixer to remove water; and recovering the elastomeric nanoparticle composition.

The terms "a," "an," and "the" are used to mean "one or more" unless the context clearly indicates to the contrary.

DETAILED DESCRIPTION

Figure 1:
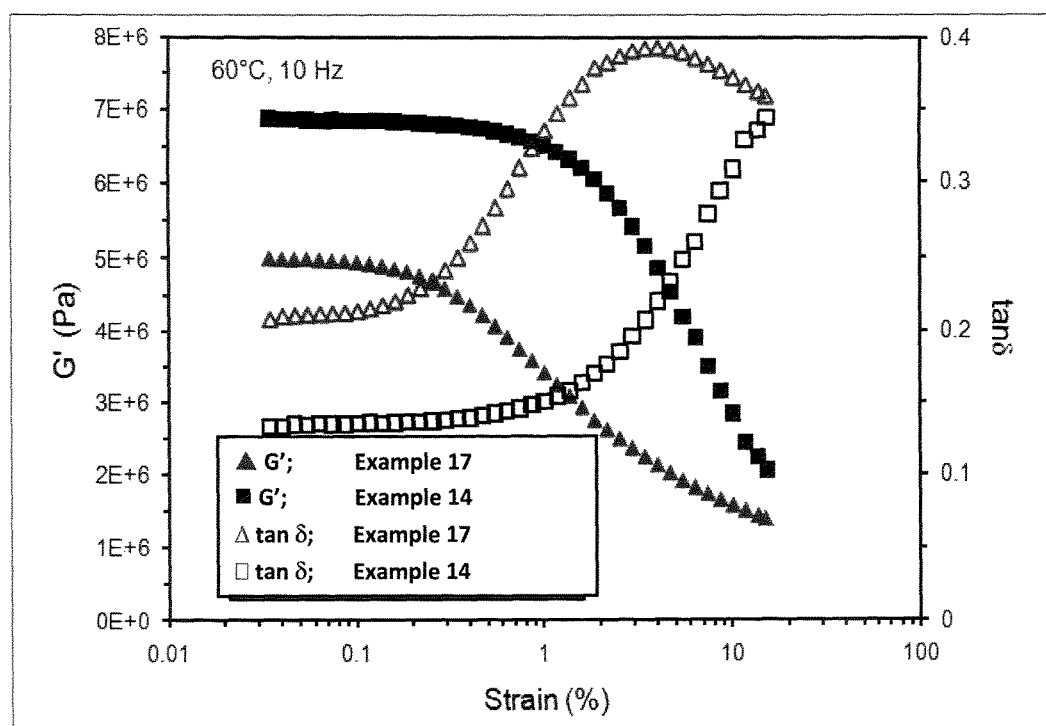
FIG. 1 is a plot of G' and tan delta versus strain % corresponding to Examples 14 and 17
Figure 2:
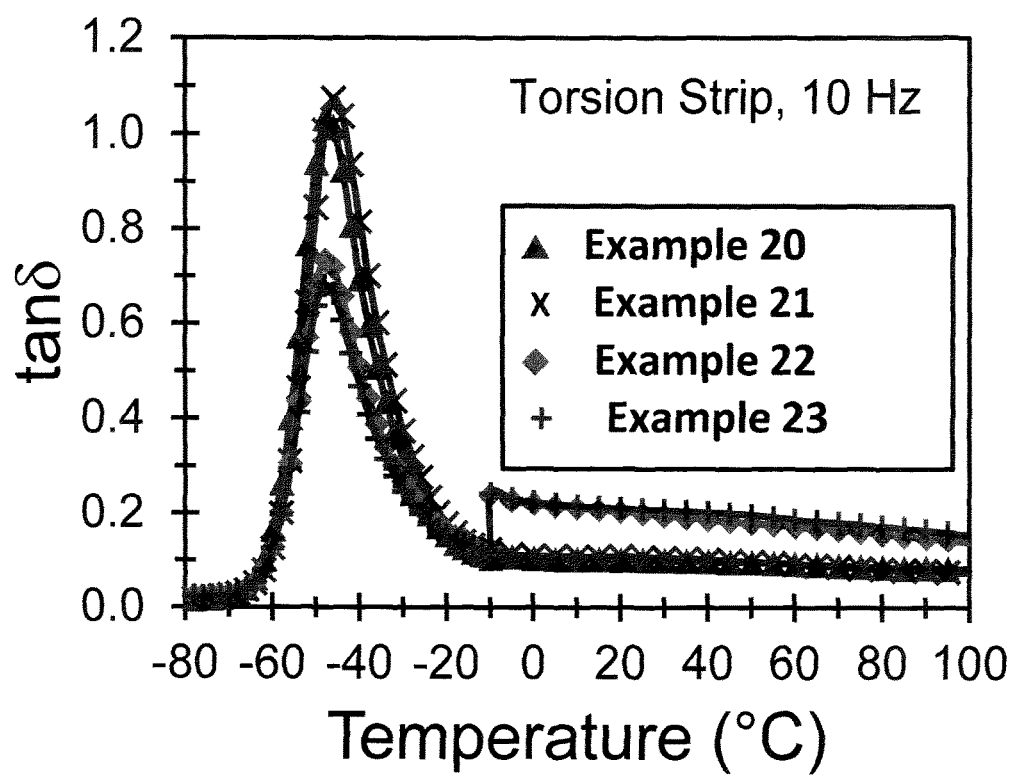
FIG. 2 is a plot of tan delta versus temperature corresponding to Examples 20-23.
Figure 3:
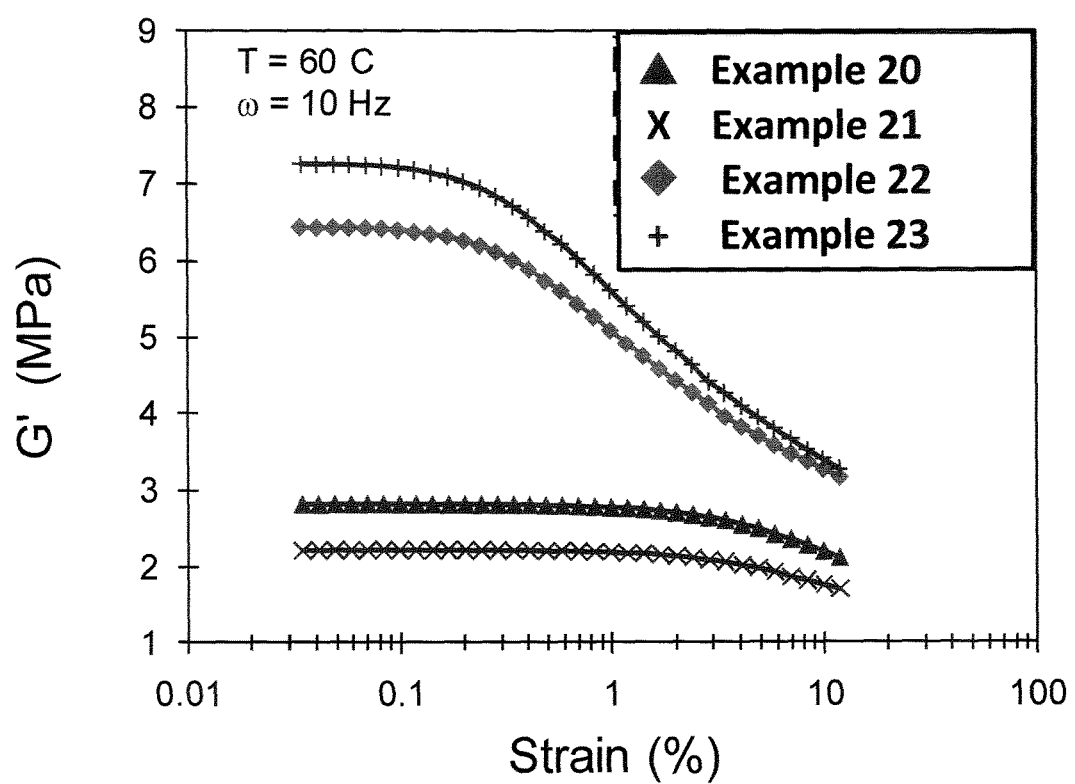
FIG. 3 is a plot of G' versus strain % corresponding to Examples 20-23.
Figure 4:
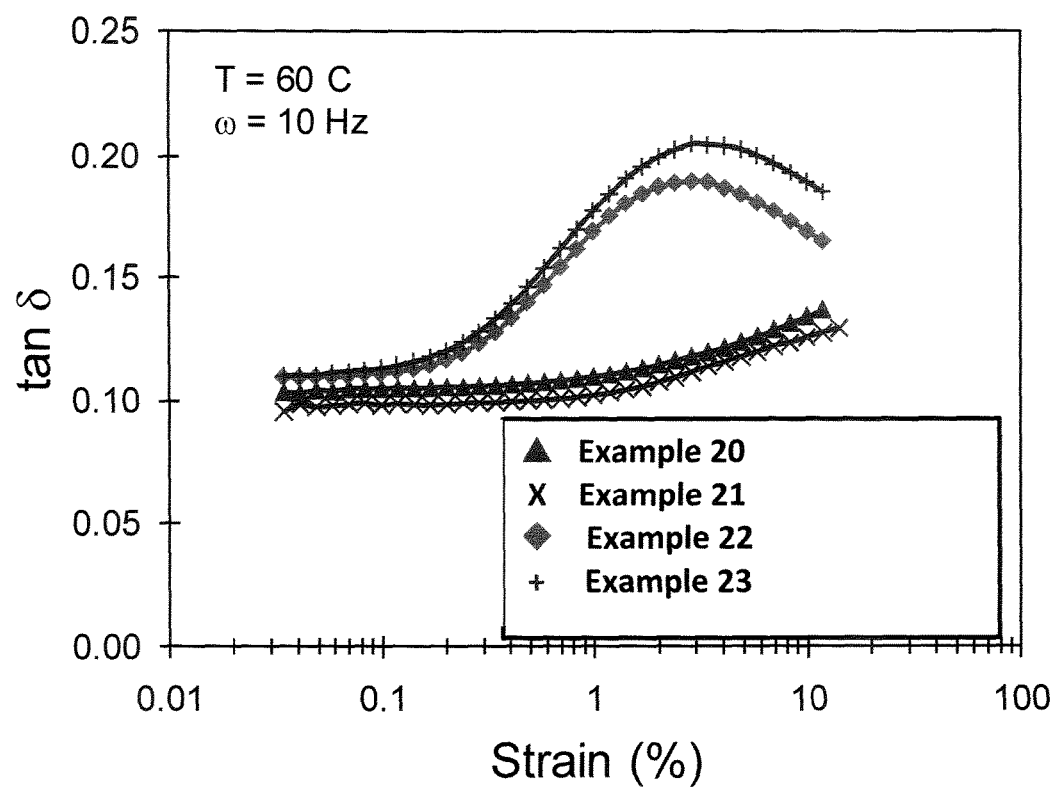
FIG. 4 is a plot of tan delta versus strain % corresponding to Examples 20-23.

Disclosed herein are emulsion synthesized nanoparticles that may be functionalized, elastomer compositions incorporating such nanoparticles, and several techniques for incorporating functionalized or un-functionalized nanoparticles into elastomeric compositions. In certain embodiments disclosed herein, the nanoparticles function as at least a partial replacement for reinforcing filler in the elastomeric composition.

In an embodiment, the nanoparticles are formed through aqueous free-radical emulsion polymerization of a vinyl-aromatic monomer and crosslinked with a multifunctional crosslinking agent that is polymerizable through an addition reaction. In an embodiment, the nanoparticles are functionalized with a group that will promote polymer interaction, but that will limit agglomeration of the functional groups on the particles to themselves, similar to the Payne effect that is seen with silica. In an embodiment, this type of particle is a moderate density polymeric composition that is much less dense than typical reinforcing fillers, such as carbon black or silica. Without being bound by theory, embodiments of the nanoparticles disclosed herein are believed to be a capable substitute for all or part of the carbon-black or silica reinforcement.

In an embodiment the nanoparticles are a copolymer of a vinyl-aromatic monomer and heterocyclic monomer, such as an oxazoline monomer. The copolymer is crosslinked with a cross-linking agent that is multifunctional and polymerizable through an addition reaction.

The vinyl-aromatic monomer may, for example, be a monomer represented by the formula

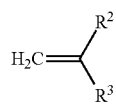

(I)

$R^2$ is selected from hydrogen, or substituted or unsubstituted, straight or branched, cyclic or acyclic $C_3$-$C_8$ alkyl groups. $R^3$ is an alkyl group selected from phenyl, naphthyl, pyridyl, or $R^2$ substituted phenyl, naphthyl, or pyridyl.

Further specific examples include styrene, alpha-methylstyrene, 1-vinyl naphthalene, 2-vinyl naphthalene, 1-alphamethyl vinyl naphthalene, 2-alpha-methyl vinyl naphthalene, vinyl toluene, isomers of vinyl toluene, 2-, 3-, and 4-substituted vinyl toluene, and 2-, 3-, or 4-ethyl styrene (ES) e, methoxystyrene, t-butoxystyrene, as well as alkyl, cycloalkyl, aryl, alkaryl, and aralkyl substituted aromatic groups, in which the total number of carbon atoms in the combined hydrocarbon is not greater than 18.

In an embodiment, vinyl-aromatic monomer contributed units comprise about 30 to about 99 weight percent of the total weight of the nanoparticles such as about 50% to about 95%, or about 55% to about 75%.

The multifunctional crosslinking agent that is polymerizable through an addition reaction includes monomers that are at least bifunctional, wherein the two functional groups are capable of reacting with the vinyl-aromatic monomer. Examples of suitable cross-linking agents include multiple-vinyl-aromatic monomers in general. Specific examples of cross-linking agents include di- or tri-vinyl-substituted aromatic hydrocarbons, such as diisopropenylbenzene, triisopropenylbenzene, divinylbenzene (DVB), trivinylbenzene, N,N'-m-phenyl enedimaleimide, N,N'-(4-methyl-m-phenylene)dimaleimide, acrylates and methacrylates of polyhydric $C_2$-$C_{10}$ alcohols, acrylates and methacrylates of polyethylene glycol having from 2 to 20 oxyethylene units, polyesters composed of aliphatic di- and/or polyols, with maleic acid, fumaric acid, and itaconic acid. Multiple-vinyl-aromatics, such as divinylbenzene, provide excellent properties for some applications.

In an embodiment the multifunctional crosslinking agent is present in an amount of about 1% to about 30% of the total combined weight of the crosslinking agent and mono-vinyl-aromatic monomer, such as about 5% to about 25% or about 10% to about 20%, or in another embodiment, up to 60%, such as about 4% to about 45%, or about 8% to about 35%.

In an embodiment the multifunctional crosslinking agent is included in a weight equal to about 0.1 to about 20 weight percent of the heterocyclic monomer contributed unit, such as about 0.1 to about 15%, about 0.5 to about 5%, about 10 to about 20%, or about 7 to about 15%.

The heterocyclic monomer, may, for example, comprise a 4 to 8 membered hydrocarbon ring including one, two, three, or four heteroatoms. The ring structure may include one or more units of unsaturation. The heteroatoms may be selected from one or more of nitrogen, oxygen, and sulfur. The cyclic structure may have constituent groups, including a group with a polymerizable double bond.

In an embodiment, the heterocyclic monomer is according to formula (II):

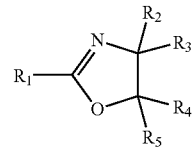

(II)

wherein $R_1$-$R_5$ are independently selected from the group consisting of hydrogen, a branched or linear $C_1$-$C_{20}$ alkyl group, a branched or linear $C_3$-$C_{20}$, cycloalkyl group, a branched or linear $C_6$-$C_{20}$ aryl group and a branched or linear $C_7$-$C_{20}$ alkylaryl group. In addition to the requirements above, $R_1$ contains at least a polymerizable double bond. For example, $R_1$ may be an unsaturated isopropenyl group, a vinyl group, or a phenyl group substituted with an unsaturated moiety. The oxazoline may be one of the vinyl oxazoline compounds disclosed in U.S. Pat. Nos. 6,596,798 and 7,186,845 incorporated herein by reference. In an embodiment, the oxazoline monomer is 2-isopropenyl-2-oxazoline (IPO).

Without being bound by theory, the oxazoline functionality is believed to provide interaction with a functionalized polymer while not contributing to agglomeration of the nanoparticle filler.

In an embodiment the nanoparticles include about 0.1 to about 30 weight percent of the heterocyclic monomer contributed unit, such as about 0.1% to about 15%, about 0.5% to about 5%, about 10% to about 20%, or about 7% to about 15%.

In an embodiment, the nanoparticles are not functionalized or copolymerized with functional group containing monomers. Such nanoparticles include a core comprising vinyl-aromatic monomer contributed units that are crosslinked with a multifunctional crosslinking agent that is polymerizable through an addition reaction. The vinyl-aromatic monomer and crosslinking agent are as described above. The term "core" used herein is not meant to imply that a separate outer layer must also be present.

In an embodiment, the nanoparticles disclosed herein have a polymeric core that is essentially free of units of unsaturation. Essentially free as used herein means other reactants are absent to the extent they materially affect the basic and novel properties of the composition.

In an embodiment, the nanoparticles disclosed herein have a weight average diameter of about 10 nm to about 500 nm as measured by field flow fractionation (FFF) with the nanoparticles swollen in THF solvent, such as, for example, about 15 to about 300 nm, about 15 to about 100 nm, about 25 to about 200 nm, or about 50 to about 100 nm. FFF analysis may also be performed on an aqueous solution of the nanoparticles, and this will give particle diameters of non-swollen nanoparticles. These measurements are approximately 60% the size of the nanoparticles that are swollen in THF, but this will vary depending on the degree of crosslinking.

In an embodiment, the nanoparticles disclosed herein have a density ranging from about 0.8 to about 1.5 g/cc, such as about 0.9 to about 1.2 g/cc. The nanoparticles may have a density that is about 60% of the density of carbon black (CB) or silica fillers (approximately 1.8 g/cc for CB and approximately 2.0 g/cc for silica). In embodiments, the nanoparticles have a density of about 30% to 90%, or 50% to 70% of carbon black or silica. This feature allows for a much lower weight reinforcing material with the same volume fraction ($v_f$) of filler and provides lower rolling resistance of a tire tread. The nanoparticle density may be affected by a number of factors including the use of termonomer functional groups or the degree of crosslinking.

In an embodiment, the nanoparticles disclosed have a relatively high glass transition temperature ($T_g$), such as about 40° C. to about 200° C., such as about 150° C. to about 195° C., or about 100° C. to about 150° C. $T_g$ may be affected by a number of factors including the nature of the monomer contributed units in the nanoparticle and the degree of crosslinking. In an embodiment, the nanoparticle $T_g$ should be at least high enough to withstand temperatures required for vulcanization and use in a tire tread, or for example, about 60° C. and above, or about 120° C. and above.

In an embodiment, the nanoparticles are incorporated into an elastomer having unsaturation to form a well-distributed elastomeric composition.

The elastomer may be selected from the group consisting of: conjugated diene polymers, copolymers or terpolymers of conjugated diene monomers and monovinyl-aromatic monomers, or more specifically, poly(styrene-butadiene), polybutadiene, natural rubber, polyisoprene, poly(isoprene-styrene), poly(isoprene-butadiene), poly(styrene-isoprene-butadiene), nitrile rubber, halobutyl rubber, butyl rubber, and combinations thereof.

In an embodiment the elastomer is functionalized with a carboxyl functional group. Other functional groups may also be used, such as hydroxyl, vinyl, hydroxylaromatics, (such as phenolics). The functional group may be incorporated into the elastomer by polymerizing functional monomers or through other known means such as post polymerization functionalization, or by functional terminators or initiators. For example, the elastomer may be carboxylated poly(styrene-butadiene).

In an embodiment, the elastomer has a number average molecular weight of about 100 kg/mol and higher, such as about 150 kg/mol to about 700 kg/mol, about 200 kg/mol to about 500 kg/mol, or about 250 kg/mol to about 450 kg/mol.

In an embodiment, the nanoparticles are present in the elastomer composition in a volume fraction (vf) of about 0.02 to about 0.5, such as, for example, about 0.05 to about 0.4, about 0.16 to about 0.35, or about 0.24 to about 0.3. Notably, the nanoparticles can be used in volume amounts that exceed the volume amounts that typical carbon black or silica fillers can be effectively used in rubber compositions, such as, for example volume fractions of about 0.20 to about 0.28, or about 0.22 to about 0.26. Embodiments of the methods and compositions disclosed herein allow for a higher volume fraction of filler than is conventional with other reinforcing fillers.

Determining volume fraction of nanoparticles in a like elastomeric matrix can be difficult (e.g. when both the nanoparticles and the elastomeric matrix include the same monomer-contributed units) with existing NMR analysis techniques. As disclosed in the Examples section a method of analysis with 13C MAS NMR was developed to determine the nanoparticle volume fraction in a like rubber matrix.

In an embodiment, the unsaturated elastomer of the composition is synthesized by emulsion polymerization and may be dry or in a latex. In another embodiment, the unsaturated elastomer is synthesized by solution polymerization.

Depending on the amount used and the character of the nanoparticles and the unsaturated elastomer, when the nanoparticle-filled composition is compared to an identical composition with the exception that the nanoparticles replace carbon black filler, the composition may have significant reductions (e.g. 5% and greater) in compound density, reduced abrasion resistance, and 60° C. tan S.

Although the nanoparticles disclosed herein are expected to provide reinforcement akin to a conventional filler, they do not self-associate and cause an increase in the Payne effect. An embodiment of the composition containing the nanoparticles may also include a portion of reinforcing filler, such as silica, carbon black, and/or other mineral fillers.

Examples of reinforcing silica fillers which can be used in the vulcanizable elastomeric compositions of the present disclosure include wet silica (hydrated silicic acid), dry silica (anhydrous silicic acid), and calcium silicate. Such reinforcing fillers are commercially available. Other suitable fillers include aluminum silicate, and magnesium silicate. In one embodiment, precipitated amorphous wet-process, hydrated silicas can be employed. For example, silica can be employed in an amount of about 1 to about 80 phr, in an amount of about 5 to about 60 phr, or in an amount of about 10 to about 40 phr. Examples of commercially available silica fillers which can be used in the present disclosure include, but are not limited to, HI-SIL 190, HI-SIL 210, HI-SIL 215, HI-SIL 233, and HI-SIL 243, produced by PPG Industries of Pittsburgh, Pa., U.S.A. A number of useful commercial grades of different silicas are also available from EVONIK (e.g., VN2, VN3), RHODIA (e.g., ZEOSIL 1165 MPO), and J. M. HUBER.

In one embodiment, the rubber compositions of the present disclosure can be compounded with any form of carbon black, with silica, as described above, or with both carbon black and silica. The carbon black can be present, for example, in an amount ranging from about 1 to about 80 phr, such as, for example, in an amount of about 5 to about 60 phr, or in an amount of about 10 to about 40 phr. The carbon black can include any commonly available, commercially-produced carbon black. In one embodiment, carbon blacks having a surface area of at least 10 $m^2/g$, such as, in the range of from 35 $m^2/g$ to 200 $m^2/g$, can be used in the present disclosure. Among useful carbon blacks are furnace blacks, channel blacks, thermal blacks, and lamp blacks. A mixture of two or more of the above blacks can be used in preparing the carbon black products of the present disclosure. Examples of suitable carbon blacks useful in the present disclosure include, but are not limited to, N-110, N-220, N-339, N-330, N-352, N-550, N-660, as designated by ASTM D-1765-82a.

In some embodiments, certain additional fillers can also be utilized in the vulcanizable elastomeric compositions of the present disclosure, including mineral fillers, such as clay, talc, aluminum hydrate, aluminum hydroxide and mica. The foregoing additional fillers may, for example, be utilized in an amount in the range of from about 0.1 to about 40 phr.

Numerous coupling agents and compatibilizing agents are known for use in combining silica and rubber, and can also be employed in the present disclosure. Silica-based coupling and compatibilizing agents suitable for use in the present disclosure include, but are not limited to, silane coupling agents containing polysulfide components, or structures such as, for example, trialkoxyorganosilane polysulfides, containing from about 2 to about 8 sulfur atoms in a polysulfide bridge such as, for example, bis-(3-triethoxysilylpropyl) tetrasulfide ("Si-69"), bis-(3-triethoxysilylpropyl) disulfide ("Si-75"), and a NXT silane. In an embodiment the composition is free of silane coupling agents.

It will be readily understood by those skilled in the art that the rubber composition can be compounded by methods generally known in the rubber compounding art, such as mixing the various vulcanizable polymer(s) with various commonly used additive materials such as, for example, curing agents, activators, retarders and accelerators, processing additives, such as oils, resins (including tackifying resins), plasticizers, pigments, additional fillers, fatty acids, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts.

One application for nanoparticle-containing rubber compounds is in tire rubber formulations for tire components, such as, for example, tire treads, tire sidewalls, inner liners, carcass plies, et al. Vulcanizable elastomeric compositions according to the present disclosure can be prepared by mixing a rubber and a nanoparticle composition either alone or with reinforcing fillers comprising silica, a carbon black, or a mixture of the two. A rubber and nanoparticle composition can also be mixed in a pre-blended composition with subsequent addition to additional rubber components. The composition can also comprise a processing aid and/or a coupling agent, a curing agent, and/or an effective amount of sulfur to achieve a satisfactory cure of the composition.

Rubbers suitable for use to make tire rubber formulations according to the present disclosure include, for example, conjugated diene polymers, copolymers or terpolymers of conjugated diene monomers and monovinyl-aromatic monomers, or more specifically, poly(styrene-butadiene), polybutadiene, natural rubber, polyisoprene, poly(isoprene-butadiene), poly(styrene-isoprene), pol(isoprene-isoprene-butadiene), nitrile rubber, halobutyl rubber, butyl rubber, and combinations thereof. Other rubbers may also be additionally utilized in the composition, including neoprene, silicone rubber, the fluoroelastomers, ethylene acrylic rubber, ethylene-propylene rubber, ethylene-propylene terpolymer, ethylene vinyl acetate copolymer, epichlorohydrin rubber, chlorinated polyethylene-propylene rubbers, chlorosulfonated polyethylene rubber, hydrogenated nitrile rubber, and tetrafluoroethylene-propylene rubber.

In an embodiment of a method for making the nanoparticles disclosed herein, the nanoparticles are synthesized by free radical aqueous emulsion polymerization. For example, the nanoparticles may be synthesized by mixing a vinyl-aromatic monomer, such as those discussed above, with a multifunctional crosslinking agent that is polymerizable through an addition reaction, such as those discussed above.

For example, an aqueous solution including vinyl-aromatic monomers, such as divinylbenzene, styrene, and ethyl styrene monomers may be prepared. Antioxidants used to stabilize the supplied materials may be extracted with a base, such as sodium hydroxide. Washing with distilled water may be performed until a substantially neutral pH is obtained, such as a pH of about 6.5 to about 8, less than 7 to about 7.3. Subsequent to the washing step, drying over a drying agent, such as anhydrous sodium sulfate may be performed.

In an embodiment, a non-functionalized nanoparticle is synthesized. In this embodiment, a vinyl-aromatic monomer blend, including the crosslinking agent, such as a DVB/Styrene/Ethyl Styrene monomer blend is added to oxygen-free water. A surfactant, such as sodium dodecyl sulfate or other common surfactants, is added. The mixture is then stirred while heating. The pH of the mixture may be controlled by adding a base such as sodium bicarbonate. In an embodiment, a radical generating initiator, such as potassium persulfate or other free radical initiator known to those in the art, is then added to start the polymerization reaction. After polymerization occurs, the reaction is terminated by adding a quenching or terminating agent. For example, aqueous solutions of sodium salt diethyldithiocarbamic acid, dimethyldithiocarbamic acid, $Na_2S_2O_3$, 1,4-hydroquinone, or other known quenching or terminating agents may be used.

In another embodiment, a functionalized nanoparticle is synthesized. In this embodiment, a vinyl-aromatic monomer blend, including the crosslinking agent, such as a DVB/styrene/ethyl styrene monomer blend is added to oxygen free water. A functional monomer, such as the oxazoline monomer discussed above, is also added. A surfactant, such as sodium dodecyl sulfate or other common surfactants, is added. The mixture is then stirred while heating. The pH of the mixture may be controlled by adding a base such as sodium bicarbonate. A radical generating initiator, such as potassium persulfate or a free radical initiator known to those in the art, is then added to start the polymerization reaction. After polymerization occurs, the reaction is terminated by adding a quenching or terminating agent. For example, aqueous solutions of sodium salt diethyldithiocarbamic acid, dimethyldithiocarbamic acid, such as sodium hyposulfate, or other known quenching or terminating agents may be used.

The functional monomer can be added at the same time as the monomer and the crosslinking agent.

Four exemplary methods for making a composition including the nanoparticles and an unsaturated elastomer are provided herein. The nanoparticles and elastomers blended by these methods, may, for example, be the nanoparticles and elastomers disclosed herein. Such as, for example, the nanoparticles comprising polymerized mono-vinyl aromaticmonomers crosslinked with a multifunctional crosslinking agent that is polymerizable through an addition reaction.

In a first embodiment of the method, the unsaturated elastomer may be dissolved in a suitable solvent such as hexane, and then this solution is mixed with the aqueous nanoparticle latex in a multi-elements static mixer. The static mixer should have sufficient elements to produce an emulsion that may be flash dried directly upon exiting the mixer. The number of elements necessary for producing such an emulsion may be readily determined by those of skill in the art. Flash drying can be accomplished by flash evaporation of the solvent at high temperatures, such as from about 100° to about 160° C.

This first embodiment corresponds to the following mixing method. Dissolving an unsaturated and uncured elastomer in a solvent. Then, mixing the elastomer in solution with an aqueous nanoparticle latex in a multi-elements static mixer to form an elastomer and nanoparticle latex mixture. Upon exiting the mixer the elastomer and nanoparticle latex mixture is flash dried.

A second embodiment includes adding a stable, aqueous latex of the unsaturated elastomer to a mildly-stirred, stable, aqueous nanoparticle latex to give a homogenous blend of the two lattices. In an embodiment, this blend can then be desolventized by: (a) evaporation, (b) coagulation with salts or polar alcohols, or (c) flash evaporation from about 60° to about 160° C. This blend may be referred to as a pre-blended nanoparticle elastomer latex, as in an embodiment it is added to and subsequently blended with a dry elastomer.

This second embodiment corresponds to the following mixing method. Blending (a) a polymeric nanoparticle latex comprising polymerized mono-vinyl monomers crosslinked with a multifunctional crosslinking agent that is polymerizable through an addition reaction into (b) an unsaturated elastomer latex to thereby form a pre-blended nanoparticle elastomer latex; and then mixing the pre-blended nanoparticle elastomer latex into a dry unsaturated elastomer. In an embodiment, prior to blending into the dry unsaturated elastomer, the pre-blended nanoparticle-elastomer latex is dried by known techniques to give an elastomeric nanoparticle blend, such as by coagulation or drum drying.

A third approach involves first introducing a dry, solid, solvent-free, unvulcanized, unsaturated elastomer to a heated mixer such as a Brabender forming a viscous mass of elastomer. Then adding an aqueous nanoparticle latex to the viscous mass of elastomer while maintaining mixing at a speed from 10 to 300 rpms and allowing the water in the nanoparticle latex to be vented off. The heating can vary from about 100° to about 180° C. with the speed varying to prevent excess foaming of the mixture.

The third method described above corresponds to the following mixing method: blending, in the substantial absence of solvent, a dry, uncured, unsaturated elastomer. Then a nanoparticle latex (nanoparticles in an aqueous latex) is added and mixed into the composition. The nanoparticles comprise polymerized mono-vinyl monomer contributed units crosslinked with a multifunctional crosslinking agent that is polymerizable through an addition reaction A fourth approach for mixing nanoparticles and elastomers comprises adding a nanoparticle latex (nanoparticles in an aqueous latex) and an elastomer into a vented, intermeshing mixer. The elastomer may be dry, uncured, and unsaturated. However, in an embodiment, the elastomer is not necessarily dry, and may be in an aqueous latex form also.

An intermeshing mixer imparts high shear forces through the design and rotation of the rotors of the mixing apparatus. Example intermeshing mixers include twin-screw extruders or tandem mixers.

The intermeshing mixing imparts additional energy to the composition being mixed. For example, this energy may be measured by the difference in the initial temperature and the drop or dump temperature of the composition undergoing mixing. In an embodiment, the temperature difference is about 5° C. to about 50° C., such as, for example, about 10° C. to about 35° C., or about 15° C. to about 30° C.

While the following will be dependent on the mass of the composition and the size of the mixer, inter alia, some example settings are provided. The intermeshing mixer may be set to various power levels such as about 10 to about 100 rpm, about 15 to about 90 rpm, or about 20 to about 60 rpm. The composition may be resident in the intermeshing mixer for a time of about 1 to about 5 minutes, such as, for example, about 2 to about 4 minutes, or about 2.5 to about 3.5 minutes.

The intermeshing mixer is vented, so as to allow removal of the water from the nanoparticle latex portion. To properly vent and remove the water, the mixture should be heated to at least the boiling point of water. This is facilitated by a vented intermeshing mixer, which, unlike some other conventional elastomer mixers has reduced foaming of latex mixtures when the temperature is raised above 100° C.

In an embodiment, the intermeshing mixer has several zones. A zone is provided for feeding the mixing components, such as the elastomer and nanoparticle latex. In an embodiment, in the feeding zone, the elastomer is continuously mixing while the aqueous nanoparticle latex is added. Example temperatures for the feeding zone are ambient temperature to less than 100° C., such as about 25° C. to about 90° C. or about 40° C. to about 60° C.

In an embodiment, in subsequent zones, the temperature of the mixture in the intermeshing mixer is held at or above 100° C. For example, in these zones the temperature of the mixture may range from about 100° C. to about 180° C., such as, for example, about 155° C. to about 175° C., or about 115° C. to about 150° C.

In an embodiment, a second zone is closed while the composition undergoes mixing. A third zone is open for venting. A fourth zone is closed for additional mixing, and the mixture is extruded in a final zone as a dry elastomer and nanoparticle mixture. If necessary to remove latent water or for other purposes, the extrudate may be re-cycled through the intermeshing mixer for several passes until the dry elastomer and nanoparticle mixture is substantially free of water, e.g. less than 5%, less than 3%, or less than 1% water. In an embodiment, the composition undergoes multiple passes through the extruder, such as, for example, two, three, four, or five passes through the extruder. Additional passes through a vented extruder allow for a greater amount of water to be vented, thereby concentrating the nanoparticle filler volume fraction in the elastomeric composition.

In an embodiment, prior to the intermeshing mixing step, the nanoparticle latex is concentrated by vacuum concentration to further aid in reducing the water content of the composition.

The vented intermeshing mixer method aids in handling of the components, provides good dispersion, and facilitates higher volume fractions of nanoparticles, e.g. about 0.26 to about 0.35, or about 0.3 to about 0.5.

While intermeshing mixing is inherently difficult to accurately calculate a volume fraction of filler, with the $^{13}C$ MAS NMR method disclosed below, the weight percent of the nanoparticles can determined by solid state NMR such that the composition of the extrudate can be accurately measured and adjusted to a desired of by normal rubber mixing techniques. This allows the preparation of a master batch such that it can be conveniently used for blending with other fillers or polymers to provide improved properties. For example, $^{13}C$ MAS NMR may be performed on a dry elastomer and nanoparticle composition and using this data the volume fraction of nanoparticles in the dry elastomer and nanoparticle composition can be determined. With this knowledge, the of of the composition can be adjusted by conventional rubber mixing techniques to a desired level by mixing in additional elastomer.

In an embodiment, the above methods may further comprise adding an additional unsaturated elastomer that may be the same or different as the dry unsaturated elastomer. In an embodiment, the nanoparticles and rubber latex or the dry nanoparticles and elastomer mixture are added as a pre-blend to the additional unsaturated elastomer. Optionally, additional mixing steps may be performed at elevated temperatures to allow water to be removed while leaving a dry nanoparticle filled rubber. The subsequently mixed dry unsaturated elastomer may be synthesized by solution polymerization or emulsion polymerization, natural rubber, or polymers synthesized by other polymerization processes. Thus, these methods of mixing are versatile in the types of elastomers that can be used.

In an embodiment, the methods for making a nanoparticle-filled elastomeric composition further include, adding and mixing in to the composition, at a temperature of up to about 190° C., or up to about 180° C., additional components for cured elastomer compositions, known to those of skill in the art, including those discussed above, for example, silica, carbon black, oil, resin, wax, coupling agents, and combinations thereof.

A curing agent may be added at a temperature of up to about 50° C. to about 110° C., and the composition may be cured at a temperature of about 140° C. to about 200° C.

The dry nanoparticle-elastomer composition may be compounded by methods generally known in the rubber compounding art, such as mixing the unsaturated elastomer and the nanoparticles with conventional amounts of various commonly used additive materials, using standard rubber mixing equipment and procedures.

A vulcanized rubber product may be produced by thermomechanically mixing the rubbery matrix polymer containing nanoparticles, and various ingredients in a sequentially step-wise manner in a rubber mixer, followed by shaping and curing the composition. By thermomechanical mixing, it is meant that various ingredients in the composition are mixed under high shear conditions where the composition autogenously heats up, with an accompanying temperature rise, as a result of the mixing primarily due to shear and associated friction within the composition in the rubber mixer.

The composition of this invention can be used for various purposes and in various articles of manufacture, such as a tire component. Such tire components can be built, shaped, molded and cured by various methods which are known and will be readily apparent to those having skill in such art. In an embodiment, a molded unvulcanized tire component is charged into a vulcanizing mold and then vulcanized to produce a tire component, comprising the composition described above.

The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

Examples 1-7

A 19% divinylbenzene (DVB) solution mixed with styrene (S) and ethyl styrene (ES) was prepared by mixing 55% DVB/ES with S. Antioxidants were extracted with 10% aqueous sodium hydroxide. This was performed three times until no color appeared in the aqueous extract. Washing with distilled water was then performed until a pH of about 7 was obtained. Drying over anhydrous sodium sulfate was performed before further use. The oxygen-free distilled water was prepared by boiling distilled water while bubbling nitrogen gas through the liquid and then cooled while continuing the nitrogen purge. Oxygen-free distilled water was used as the reaction media and to prepare all reagents.

A Wyatt Technology instrument was used for the FFF analysis. The samples for FFF were prepared by dilution of the latex to approximately five-tenths of a milligram of nanoparticles per 1 mL of water. The samples were then injected into the instrument thereby introducing about 50 micrograms of nanoparticles into the sample chamber.

In each example, where applicable, pyrolysis GC-MS was used to identify the DVB/S and IPO incorporation.

Pyrolysis GC-FID was used to confirm the particle composition in certain Examples. For the pyrolysis analysis, samples with known compositions were used for the calibration of styrene, ethyl styrene and divinylbenzene. The conditions used are shown below.

Pyrolysis unit: CDS 5250 Pyrolysis with the auto sampler
Gas chromatograph: Agilent 7890 GC system
Detector: Flame ionization detector (FID)
Sample sizes use for the pyrolysis: about 1 mg
Pyrolyzer valve-oven temperature: 300° C.
Pyrolysis temperature: 700° C.
Pyrolysis time: 6 sec
Transfer line temperature: 300° C.
GC injection port temperature: 280° C.
GC split ratio: 1:50
GC column: HP-5MS (30 m×0.25 mm×0.5 11 μm film)
GC column flow rate: 2 mL/min
Air flow to the detector: 300 mL/min
$H_2$ flow to the detector: 30 mL/min
Make up $N_2$ gas to the detector: 30 mL/min Table 1 below shows the temperature program of the GC column oven.

TABLE 1

|  | Temperature/ ° C. | Rate ° C./min | Hold time/min | Total time/min |
| --- | --- | --- | --- | --- |
| Initial | 40 |  | 1 | 1 |
| Final | 260 | 15 | 10 | 25.7 |

All samples were run multiple times with blanks in between. U.S. provisional application 61/487,756 filed on May 19, 2011, filed as non-provisional application U.S. Ser. No. 13/476,387, filed on May 21, 2012, published as U.S. 2012/0296054, which provides a full discussion of the general pyrolysis method is herein incorporated by reference.

Example 1

To a 250 mL Erlenmeyer flask containing a 5 mm magnetic stir bar was added 68.02 grams of oxygen-free water. To this flask was then added 22.61 grams of a 19.01% DVB/S mixture that contained 4.30 grams of DVB, 14.79 grams of S and 3.52 grams of ES. This was followed by 0.19 g of sodium bicarbonate and 3.20 g of sodium dodecyl sulfate. This mixture was stirred slowly (about 120 rpm) with a magnetic stirrer while heating in a water bath that was controlled at 60° C. At this time a white opaque mixture was obtained. Then 8.0 mL of a 0.037 M aqueous solution (from oxygen-free water) of potassium persulfate was added and the stirring speed was increased to 300 to 400 rpm. Within 30 minutes the mixture went from a white opaque suspension to an almost translucent blue-white milky emulsion. The temperature of the water bath was held in the 58° C. to 63° C. range for 7 hours before termination of the polymerization with 0.6 mL of a 0.5 M aqueous solution of 1,4-hydroquinone.

Upon cooling, no odor of DVB, S, or ES could be detected. The pH measured was about 7 by paper strip measurement. The calculated solids content of the latex was 24.923%. Field Flow Fractionation (FFF) measurement in THF as a solvent showed the following particle size distributions of $d_n$=21.4 nm, $d_w$=22.6 nm, and $d_z$=24.7 nm. The particles were swollen in the THF solvent. Further details are reported in Table 2.

Example 2

Example 2 was prepared by the same method as Example 1, however, the component amounts were varied and the potassium persulfate was added in solid form. The component details and particle measurements are reported in Table 2.

Example 3

To a 2 L resin kettle containing an $N_2$ inlet tube and an electric stirrer with a paddle blade was added 542.40 grams of oxygen-free distilled water. Then 1.53 grams of sodium bicarbonate and 25.77 grams of sodium dodecyl sulfate were added while maintaining the nitrogen purge, stirring at 150 rpm, and heating to 45° C. To this aqueous solution was added 180.88 grams of 18.86% DVB/S mixture that had been extracted free of antioxidant. Immediately after the monomers were added, 64 mL of a 0.037 M aqueous solution of potassium persulfate (prepared with oxygen free water) was added. A white emulsion was initially formed that became opaque within 30 minutes while further heating the emulsion to above 60° C. and stirring at about 400 rpm. After reacting for 4 hours the heating was stopped and 0.72 mL of a 3.30M aqueous solution of 40% sodium salt of dimethyl dithiocarbamic acid was added.

Upon cooling, no odor of DVB, S or ES could be detected. The absence of DVB, S, and ES was confirmed by GC analysis. The pH measured was about 7 by a paper strip measurement.

The calculated polymeric solids were 22.19%. The maximum particle size in the latex was determined by FFF measurement in THF as a solvent, which showed the following particle size distributions: $d_n$=20.8 nm, $d_w$=23.1 nm, and $d_z$=27.3 nm with a dispersion of 1.11. Further details are reported in Table 2.

Examples 4 and 5

Examples 4 and 5 were prepared by the same method as Example 1; however, the component amounts were varied. Further details are reported in Table 2.

Example 6

To a 2 L resin kettle containing a $N_2$ inlet tube and an electric stirrer with a paddle blade was added 541.70 grams of oxygen-free distilled water. Then 2.88 grams of sodium bicarbonate and 27.65 grams of sodium dodecyl sulfate were added while maintaining the nitrogen purge. The components were stirred at 150 rpm while heating to 45° C. To this aqueous solution was added 160.0 grams of 18.92% DVB/S mixture that had been extracted free of antioxidant and 29.5 grams of 2-isopropenyl-2-oxazoline (IPO). Immediately after the monomers were added, 64 mL of a 0.037 M aqueous solution of potassium persulfate (prepared with oxygen free water) was added. A white emulsion was initially formed that became opaque within 10 minutes. The power was interrupted for 50 minutes at this point, just as the exothermic reaction began and the temperature reached 52° C. When the power was restored the stirring was continued at 670 rpm and the temperature was increased from 48 to 72° C. for the next hour before being reduced to 450 rpm for 16 hours at the 72° C. After this time, heating was stopped and 0.72 mL of a 3.30M aqueous solution of 40% sodium salt of dimethyl dithiocarbamic acid was added.

Upon cooling, no odor of DVB, S, ES or IPO could be detected. The absence of DVB, S, ES, and IPO was confirmed by GC analysis. The pH measured was about 7 by a paper strip measurement. The particle size in the latex was determined by FFF measurement in THF as a solvent and showed the following distribution of THF swollen particle: $d_n$=76.6 nm, $d_w$=161.7 nm and $d_z$=234.7 nm, with a dispersion of 2.11. Further details are reported in Table 2.

The calculated polymeric solids were 23.76%, which had a composition of 14.86% IPO and 16.11% DVB. The incorporation of the IPO was confirmed by pyrolysis GC-FID.

Example 7

To a 250 mL Erlenmeyer flask containing a 5 cm magnetic stir bar was added 74.15 grams of oxygen free water, 22.61 grams of a 19.01% DVB/S mixture that contained 4.01 grams of DVB, 13.81 grams of S and 3.28 grams of ES. This was followed by 0.26 g of sodium bicarbonate, 3.40 g of sodium dodecyl sulfate and 3.70 grams of 2-isopropenyl-2-oxazoline (IPO). This mixture was stirred slowly (about 120 rpm) with a magnetic stirred while heating in a water bath that controlled at 60° C. At this time a white opaque mixture was obtained. Then 8.0 mL of a 0.037 M aqueous solution (prepared from oxygen free water) of potassium persulfate was added and the stirring speed was increased to 300 to 400 rpm. Within 30 minutes the mixture went from a white opaque suspension to an almost translucent blue-white milky emulsion. The temperature of the water bath was held in the 58 to 63° C. range for 7 hours before termination the polymerization with 0.07 grams of the sodium salt diethyl dithiocarbamic acid. Upon cooling no odor of DVB, S, ES or IPO could be detected. The pH measured was ~7 by paper strip measurement. The calculated functional crosslinked styrene content was 22.39% and the total solids of the latex was 25.94%, FFF (Field Flow Fraction) measurement in THF as the solvent showed the swollen particle size distributions of $d_n$=20.1 nm, $d_w$=23.2 nm and $d_z$=32.0 nm with a dispersion of 1.15.

TABLE 2

|  |  | Ex. 1 | Ex. 2 | Ex. 3 | Ex. 4 | Ex. 5 | Ex. 6 | Ex. 7 |
|---|---|---|---|---|---|---|---|---|
| Water | grams | 68.02 | 63.33 | 542.4 | 73.5 | 68.92 | 541.7 | 74.15 |
| SLS | grams | 3.20 | 1.70 | 25.77 | 3.51 | 3.50 | 27.65 | 3.40 |
| $NaHCO_3$ | grams | 0.19 | 0.18 | 1.53 | 0.29 | 0.31 | 2.88 | 0.36 |
| Extracted mix of |  |  |  |  |  |  |  |  |
| Styrene (S) | grams | 65.45 | 27.34 | 132.00 | 132.20 | 132.10 | 132.20 | 65.45 |
| 55% DVB | grams | 34.58 | 4.68 | 68.88 | 69.34 | 69.36 | 69.34 | 34.58 |
| % DVB | in mix | 19.01 | 8.04 | 18.86 | 18.92 | 18.94 | 18.92 | 19.01 |
| S/DVB Mixture, grams |  | 22.61 | 21.92 | 180.88 | 24.6 | 25.17 | 169.4 | 21.11 |
| DVB | grams | 4.30 | 1.76 | 34.11 | 4.66 | 4.77 | 31.98 | 4.01 |
| Et Styrene (ES) | grams | 3.52 | 1.44 | 27.91 | 3.81 | 3.90 | 26.17 | 3.28 |
| IPO | grams | 0 | 0 | 0 | 2.14 | 2.86 | 29.50 | 3.70 |
| DVB/hundred vinyl-aromatics, wt % |  | 19.01 | 8.04 | 18.86 | 17.41 | 17.00 | 16.11 | 16.18 |
| IPO in particle, wt % |  | 0 | 0 | 0 | 8.00 | 10.20 | 14.86 | 14.91 |
| $K_2S_2O_8$, grams |  |  | 0.1 |  |  |  |  |  |
| $K_2S_2O_8$, mL of 0.037M soln. |  | 8.0 |  | 64.0 | 8.0 | 8.0 | 64.0 | 8.0 |
| 1,4-Hydroquinone, mL 0.5M soln. |  | 3 | 3 |  |  |  |  |  |
| $Et_2NCS_2Na$, grams |  |  |  |  |  |  |  | 0.07 |
| $Me_2NCS_2Na$, mL of 3.30M soln. |  |  |  | 0.72 | 0.30 | 0.30 | 0.72 |  |
| Nanoparticles, g/100 mL |  | 21.53 | 24.29 | 22.19 | 23.80 | 25.70 | 23.76 | 22.39 |
| Total Weight, grams |  | 105.02 | 90.23 | 815.30 | 112.34 | 109.06 | 835.45 | 110.79 |
| FFF particle size |  |  |  |  |  |  |  |  |
| $d_n$, ave | nm | 21.7 |  | 20.8 | 81.2 | 59.4 | 76.6 | 20.1 |
| $d_w$, ave | nm | 22.6 |  | 23.1 | 93.8 | 89.4 | 161.7 | 23.2 |
| $d_z$, ave | nm | 24.7 |  | 27.3 | 113.8 | 220.1 | 234.7 | 32 |
| Dispersion, w/n |  | 1.04 |  | 1.11 | 1.16 | 1.51 | 2.11 | 1.15 |

Examples 8-17

Latex samples of nanoparticles formed in Examples 3 and 6 were blended with emulsion-polymerized styrene-butadiene rubber (E-SBR) latexes and then dried to form a polymer-filler composite with filler volume fraction of approximately 0.2 (100 phr of polymer and 30 phr of nanoparticles). The E-SBR materials included non-functionalized E-SBR latex, (ROVENE 4848 with rosin acid soap emulsifier ($T_g$=−38° C., 51% total solids, from Mallard Creek Polymers, Inc., Charlotte, N.C.) and carboxylated E-SBR (ROVENE 5044 with anionic emulsifier ($T_g$=−35° C.; 51% total solids; from Mallard Creek Polymers, Inc., Charlotte, N.C.).

The dried nanoparticle and polymer pre-blends were mixed in the formulation given below using a Brabender mixer having cam rotors that have a 307 $cm^3$ working volume. The nanoparticles were employed as the only filler in the rubber and were also considered in combination with carbon black (50/50 by volume). All of the final compounds were designed to have a filler volume fraction of approximately 0.2, which required a lower phr amount of the nanoparticles than carbon black. This was due to the lower density (approx. 1.1 g/cc) of the nanoparticles compared to carbon black (approx. 1.8 g/cc). Test results are reported in Table 3 and FIG. 1.

According to the disclosure herein, in certain embodiments, significant reductions (e.g. 5% and greater) in compound density, abrasion loss, and 60° C. tan δ may be seen. Abrasion loss may be performed as disclosed in U.S. 2003/0127169, which is herein incorporated by reference.

The areas in the table marked N/A represent data which could not be acquired due to difficult de-molding of compounds sticking to the mixer and the mill. Testing denoted as SS was done in a strain sweep mode from 0.25 to 14.75% E in 0.25% increments. TS was done by a temperature sweep from −80° C. to 100° C. in 5° C. increments.

TABLE 3

| Example: | 8 | 9 | 10 | 11 | 12 | 13 | 14 | 15 | 16 | 17 |
|---|---|---|---|---|---|---|---|---|---|---|
| Carboxylated E-SBR (phr): | 100 | 100 | 100 | 100 | 100 |  |  |  |  |  |
| E-SBR (phr): |  |  |  |  |  | 100 | 100 | 100 | 100 | 100 |
| Example 6 nanoparticles | 30 |  | 15 |  |  | 30 |  | 15 |  |  |
| Example 3 nanoparticles |  | 30 |  | 15 |  |  | 30 |  | 15 |  |
| N339 CB (phr): |  |  | 25 | 25 | 50 |  |  | 25 | 25 | 50 |
| Stearic Acid (phr) | 2 | 2 | 2 | 2 | 2 | 2 | 2 | 2 | 2 | 2 |
| Zinc Oxide (phr) | 2 | 2 | 2 | 2 | 2 | 2 | 2 | 2 | 2 | 2 |
| Antioxidant (phr) | 0.9 | 0.9 | 0.9 | 0.9 | 0.9 | 0.9 | 0.9 | 0.9 | 0.9 | 0.9 |
| Sulfur (phr) | 1.2 | 1.2 | 1.2 | 1.2 | 1.2 | 1.2 | 1.2 | 1.2 | 1.2 | 1.2 |
| CBS Accelerator (phr) | 0.7 | 0.7 | 0.7 | 0.7 | 0.7 | 0.7 | 0.7 | 0.7 | 0.7 | 0.7 |

TABLE 3-continued

| Example: | 8 | 9 | 10 | 11 | 12 | 13 | 14 | 15 | 16 | 17 |
|---|---|---|---|---|---|---|---|---|---|---|
| t50% [171° C. Cure](min): | 11.5 | 9.5 | 7.1 | 5.8 | 5.1 | 8.3 | 5.4 | 4.9 | 4.2 | 2.5 |
| ML1+4 @ 130° C.: | 26.5 | 17.9 | 29.2 | 25.2 | 36.7 | 52.6 | 17.6 | 57.7 | 33.8 | 53.2 |
| G' [TS, 0° C., 10 Hz, 2%] (MPa): | 17.7 | N/A | 20.4 | 26.5 | 27.4 | 18.5 | 17.6 | 20.0 | 20.0 | 11.9 |
| tanδ [TS, 0° C., 10 Hz, 2%]: | 0.485 | N/A | 0.527 | 0.465 | 0.573 | 0.312 | 0.386 | 0.398 | 0.475 | 0.572 |
| G' [TS, 60° C., 10 Hz, 2%](MPa): | 2.67 | N/A | 2.75 | 3.60 | 3.73 | 5.43 | 4.27 | 4.96 | 3.84 | 4.00 |
| tanδ [TS, 60° C., 10 Hz, 2%]: | 0.257 | N/A | 0.300 | 0.315 | 0.347 | 0.175 | 0.224 | 0.223 | 0.287 | 0.334 |
| Decrease in tanδ at 60° C. (%): | 25.9 | N/A | 13.5 | 9.2 | 0.0 | 47.6 | 32.9 | 33.2 | 14.1 | 0.0 |
| G' [SS, 60° C., 10Hz, 5%] (MPa): | 1.66 | N/A | 1.65 | 2.07 | 2.05 | 4.53 | N/A | 3.26 | 2.15 | 2.02 |
| tanδ [SS, 60° C., 10 Hz, 5%+: | 0.315 | N/A | 0.362 | 0.375 | 0.376 | 0.234 | N/A | 0.293 | 0.348 | 0.391 |
| ΔG' [SS, 60° C., 10Hz, 0.03%-15%](MPa): | 0.72 | N/A | 1.23 | 2.67 | 2.33 | 4.83 | N/A | 4.36 | 3.14 | 3.62 |
| 50% Modulus @ 23° C.(MPa): | 2.19 | N/A | 2.08 | 1.65 | 2.78 | 1.22 | 0.69 | 1.35 | 1.02 | 1.74 |
| 300% Modulus @ 23° C. (MPa): | N/A | N/A | N/A | N/A | N/A | 3.87 | 1.67 | 5.95 | 5.03 | N/A |
| Break Stress @ 23° C. (MPa); | 6.4 | N/A | 6.0 | 6.1 | 7.1 | 5.3 | 4.8 | 6.3 | 6.1 | 7.8 |
| Elongation at Break @ 23° C. (%) | 197 | N/A | 183 | 244 | 151 | 426 | 612 | 324 | 366 | 220 |
| Wear Wt. Loss at 25% slip (g): | 0.241 | N/A | 0.281 | 0.241 | 0.280 | 0.089 | 0.061 | 0.128 | 0.126 | 0.173 |
| Wear Resist. Improvement at 25% slip (%): | 13.9 | N/A | -0.4 | 13.9 | 0.0 | 48.6 | 64.7 | 26.0 | 27.2 | 0.0 |
| Cured Compound Density (g/cc): | 1.009 | N/A | 1.085 | 1.088 | 1.162 | 1.007 | 1.004 | 1.080 | 1.082 | 1.166 |
| Decrease in Compound Density (%): | 13.2 | N/A | 6.6 | 6.4 | 0.0 | 13.6 | 13.9 | 7.4 | 7.2 | 0.0 |

Example 18

To a 2 L resin kettle containing a $N_2$ inlet tube and an electric stirrer with a paddle blade was added 566.19 grams of oxygen-free distilled water. Then, 1.51 grams of sodium bicarbonate and 25.05 grams of sodium dodecyl sulfate were added while maintaining the nitrogen purge, stirring at about 150 rpm, and heating to 48° C. To this aqueous solution was added 195.51 grams of 18.98% DVB/S mixture that had been extracted free of antioxidant and 28.12 grams of IPO. Immediately after the monomers were added, 32 mL of a 0.037 M aqueous solution of potassium persulfate (prepared with oxygen-free water) was added. A white emulsion was initially formed that became opaque within 10 minutes. The stirring was continued at 380 rpm and the temperature was increased to 83° C. for the next hour. Then the heating was stopped and 0.72 mL of a 3.30M aqueous solution of 40% sodium salt of dimethyl dithiocarbamic acid was added.

Upon cooling, no odor of DVB, S, ES or IPO could be detected. The absence of DVB, S, ES and IPO was confirmed by GC analysis.

A total of 798.24 g of latex was obtained with a pH of about 7, as measured by a paper strip. The calculated polymeric solids were 23.34%, which had a composition of 9.90% IPO and 16.59% DVB. The incorporation of the IPO was confirmed by pyrolysis GC. The particle size in the latex was determined by FFF measurement, as discussed above, in THF as a solvent and showed the following distribution of THF swollen particle: $d_n$=15.3 nm, $d_w$=17.2 nm and $d_z$=19.2 nm with a dispersion of 1.12. Further details of the blend are presented in Table 4.

Example 19

To a 2 L resin kettle containing an $N_2$ inlet tube and an electric stirrer with a paddle blade was added 590.16 grams of oxygen-free distilled water. Then 1.56 grams of sodium bicarbonate and 26.29 grams of sodium dodecyl sulfate were added while maintaining the nitrogen purge, stirring at 150 rpm, and heating to 45° C. To this aqueous solution was added 196.98 grams of 18.81% DVB/S monomer mixture that had been extracted free of antioxidant. Immediately after the monomers were added, 32 mL of a 0.037 M aqueous solution of potassium persulfate (prepared with oxygen free water) was added. A white emulsion was initially formed that became opaque within 30 minutes while further heating to 83° C. and stirring at about 360 rpm. After reacting for 4 hours, the heating was stopped, and 0.72 mL of a 3.30M aqueous solution of 40% sodium salt of dimethyl dithiocarbamic acid was added.

Upon cooling, no odor of DVB, S or ES could be detected. The absence of DVB, S, and ES was confirmed by GC analysis.

The isolated weight of latex was 823.82 g and it had a pH of about 7 as measured by a paper strip. The calculated polymeric solids were 23.24% and 26.54% total solids. The particle size in the latex was determined by FFF measurement, as discussed above, using THF as a solvent and showed a distributions of $d_n$=18.7 nm, $d_w$=19.9 nm and $d_z$=21.0 nm with a dispersion of 1.06. The FFF analysis was also performed on an aqueous solution of the nanoparticles that did not cause the nanoparticles to swell, and the measurements were approximately 60% the size of the nanoparticles that were swollen in THF. The $d_n$ of the nanoparticles in water (a non-swelling solvent) was 12.0, and the $d_z$ was 16.1.

Examples 20 and 21

The nanoparticle latexes of Examples 18 and 19 were then blended in a Brabender mixer with a standard solution styrene-butadiene rubber (std. S-SBR), having a 12% vinyl polybutadiene content, a 23.5% styrene content, a Mooney $ML_4$ at 100° C. of 55, and a $T_g$ of −62° C. Further details of the blending are presented in Table 4.

4 phr of the SBR was replaced with 4 phr of sodium dodecyl sulfate. Additional sodium dodecyl sulfate surfactant was added in Example 25 to demonstrate whether the surfactant had any effect on the properties. It did not show any relevant effect. The density difference between the two fillers thus allows a lower density filled rubber stock to be prepared. The nanoparticles of Examples 22 and 23 have an approximate density of 1.1 g/cc as compared to the carbon black of Example 24 at approximately 1.8 g/cc.

TABLE 4

|  | Example 20 |  |  |  | Example 21 |  |  |  |
| --- | --- | --- | --- | --- | --- | --- | --- | --- |
| Std. S-SBR (phr) | 100 |  |  |  | 100 |  |  |  |
| Nanoparticle latex used | Ex. 18 |  |  |  | Ex. 19 |  |  |  |
| % nanoparticles in latex | 26.34 |  |  |  | 23.24 |  |  |  |
| g latex used | 39.86 |  |  |  | 45.18 |  |  |  |
| g nanoparticles used | 10.5 |  |  |  | 10.5 |  |  |  |
| phr, nanoparticles in mixture | 30.00 |  |  |  | 30.00 |  |  |  |
| % solids (inorganic salts) | 3.15 |  |  |  | 3.31 |  |  |  |
| $v_f$ | 0.2023 |  |  |  | 0.2023 |  |  |  |
| Particle functionality | Yes |  |  |  | No |  |  |  |
|  | Step | Temp | rpm | Mins. | Step | Temp | Rpm | Mins. |
| Mixing Conditions (small Brabender mixer with a 59.5 cm³ working volume) | Rubber | 105 | 50 | 1 | Rubber | 105 | 50 | 1 |
|  | 1/3 latex | 105 | 30 | 3 | 1/3 latex | 105 | 30 | 3 |
|  | 1/3 latex | 105 | 30 | 3 | 1/3 latex | 105 | 30 | 3 |
|  | 1/3 latex | 105 | 30 | 3 | 1/3 latex | 105 | 30 | 3 |
|  |  | 130 | 30 | 3 |  | 130 | 30 | 3 |
|  |  | 140 | 50 | 2 |  | 140 | 50 | 2 |
|  | Drop |  |  | 25 | Drop |  |  | 25 |
| Mix Number- | 1 | 2 | Average |  | 1 | 2 | Average |  |
| latex, charge, g | 41.52 | 41.6 | 41.56 |  | 44.62 | 44.23 | 44.43 |  |
| Latex used, g | 40.86 | 40.93 | 40.90 |  | 43.49 | 43.48 | 43.49 |  |
| Particles used, g | 10.76 | 10.78 | 10.77 |  | 10.11 | 10.10 | 10.11 |  |
| phr, particles used | 30.75 | 30.80 | 30.78 |  | 28.88 | 28.87 | 28.87 |  |
| $v_f$ of particles in mix | 0.2063 | 0.2066 | 0.2065 |  | 0.1962 | 0.1962 | 0.1962 |  |
| Salts present, g | 1.29 | 1.29 | 1.29 |  | 1.44 | 1.44 | 1.44 |  |
| TY recovery, g | 47.05 | 47.07 | 47.06 |  | 46.55 | 46.54 | 46.55 |  |
| Actual recovery, g | 46.53 | 46.1 | 46.32 |  | 43.7 | 46.16 | 44.93 |  |
| % recovered | 98.9% | 97.9% | 98.4% |  | 93.9% | 99.2% | 96.5% |  |

Examples 22-25

In Examples 22 and 23, the nanoparticle/solution SBR blends of Examples 20 and 21 were blended with dried rubber in a small Brabender mixer by first adding solution polymerized SBR having a 12% vinyl polybutadiene content, a 23.5% styrene content, a Mooney $ML_4$ at 100° C. of 55, and a $T_g$ of −62° C. Then the nanoparticle latex was added as shown in Table 4. The nanoparticles were employed as the only filler in the rubber and were calculated to have a filler volume fraction ($v_f$) of approximately 0.2.

In Examples 24 and 25, a control with 50 phr CB was prepared with this rubber and had the same $v_f$ as the nanoparticles. Example 25 differs from Example 24 in that Table 5 and FIGS. 2-5 report further details of Examples 22-25. According to these teachings, significant reductions in compound density and 60° C. tan δ (e.g. 5% or more) may be possible.

TABLE 5

|  | Ex. 22 | Ex. 23 | Ex. 24 | Ex. 25 |
| --- | --- | --- | --- | --- |
| Std. S-SBR (phr): | 100 | 100 | 100 | 96 |
| CB (N339) (phr): |  |  | 50 | 50 |
| Example 18 nanoparticles (IPO functionalized) | 30 |  |  |  |
| Example 19 nanoparticles |  | 30 |  |  |
| Sodium Dodecyl Sulfate (phr): |  |  |  | 4 |
| Stearic Acid (phr) | 2 | 2 | 2 | 2 |

TABLE 5-continued

|  | Ex. 22 | Ex. 23 | Ex. 24 | Ex. 25 |
|---|---|---|---|---|
| Zinc Oxide (phr) | 2.5 | 2.5 | 2.5 | 2.5 |
| Antioxidant (phr) | 1 | 1 | 1 | 1 |
| Sulfur(phr) | 1.3 | 1.3 | 1.3 | 1.3 |
| DPG Accelerator (phr) | 0.2 | 0.2 | 0.2 | 0.2 |
| CBS Accelerator (phr) | 1.7 | 1.7 | 1.7 | 1.7 |
| Approx. Filler Volume fraction, $v_r$: | 0.2 | 0.2 | 0.2 | 0.2 |
| t50% [171° C. Cure] (min): | 4.9 | 4.4 | 2.5 | 2.3 |
| t90% [171° C. Cure] (min): | 6.5 | 5.8 | 3.4 | 3.3 |
| MH-ML [171° C. Cure] (dN-m): | 11.8 | 10.6 | 18.9 | 17.8 |
| ts5 [ML Scorch at 130° C.] (min): | 52.8 | 39.1 | 17.6 | 16.6 |
| ML1 + 4 @ 130° C.: | 50.8 | 41.9 | 75.9 | 75.9 |
| 50% Modulus @ 23° C. (MPa): | 0.97 | 0.85 | 1.57 | 1.62 |
| 300% Modulus @ 23° C. (MPa): | 2.9 | 2.5 | 14.4 | 13.7 |
| $T_b$, Break Stress @ 23° C. (MPa): | 5.7 | 5.6 | 15.7 | 16.9 |
| $E_b$, Elong. at Break @ 23° C.(%): | 537 | 533 | 322 | 357 |
| tan δ [TS; 0° C.; 10 Hz, 2%]: | 0.104 | 0.11 | 0.221 | 0.225 |
| G'(MPa) [TS; 0° C.; 10 Hz, 2%]: | 5.72 | 4.79 | 10.67 | 13.46 |
| tan δ [TS; 30° C.; 10 Hz, 2%]: | 0.1 | 0.106 | 0.196 | 0.208 |
| G'(MPa) [TS; 30° C.; 10 Hz, 2%]: | 4.67 | 3.82 | 7.46 | 9.23 |
| tan δ [TS; 60° C.; 10 Hz, 2%]: | 0.092 | 0.092 | 0.172 | 0.187 |
| G'(MPa) [TS; 60° C.; 10 Hz, 2%]: | 4.02 | 3.37 | 5.95 | 6.93 |
| Lambourn Wear Index at 25% slip: | 98 | 97 | 100 | 102 |
| Cured Compound Density (g/cc): | 1.005 | 1.008 | 1.169 | 1.155 |
| Decrease in Compound Density (%): | 14.0 | 13.8 | 0.0 | 1.2 |

Example 26

Preparation of Low Solids Latex of Styrene/Divinylbenzene Particles

To a 2 L resin kettle containing an $N_2$ inlet tube and an electric stirrer with a paddle blade was added 840.72 grams of oxygen-free distilled water. Then 1.57 grams of sodium bicarbonate and 26.15 grams of sodium dodecyl sulfate while added while maintaining the nitrogen purge, while stirring at about 150 rpm and heating to 40° C. To this aqueous solution was added 195.14 grams of 19.35% DVB/S monomer mixture that had been extracted free of antioxidant. Immediately after the monomers were added, stirring was increased and 32 mL of a 0.037 M aqueous solution of potassium persulfate (prepared with oxygen free water) was added. A white emulsion was initially formed that became opaque within 10 minutes. The stirring was continued at 360 rpm and the temperature was increased to 73° C. during the next 1.3 hrs. The temperature was held above 53° C. for the next 3 hours before 0.72 mL of a 3.30M aqueous solution of 40% sodium salt of dimethyl dithiocarbamic acid was added to deactivate the remaining persulfate catalyst.

The emulsion was then removed from the reactor and allowed to cool. Upon cooling no odor of DVB, S or ES could be detected. The absence of DVB, S, or ES was confirmed by GC analysis.

A total of 1115.03 g of latex was obtained with a pH of about 7 as measured by a paper strip. The latex had a calculated nanoparticle concentration of 17.28% and total solid concentration of 19.75%. The nanoparticles that had a composition of 19.35% DVB were diluted with THF to provide swollen particles having average diameter as measured by FFF of: $d_n$=18.7 nm, $d_w$=21.5 nm and $d_z$=24.5 nm with a dispersion of 1.15. Repeating the FFF using water as the media gave a $d_z$ of 20.3 nm.

Example 27

Example 24 was concentrated in a 1 L flask with a Roto-Vac, using moderate vacuum while heating the water bath to 36° C. to 42° C. over an 8 hour period. The final concentrated latex obtained weighed 471.61 g and had a calculated concentration of 36.5% nanoparticles and 41.7% total solids.

Examples 28-30

For the mixing of nanoparticle latexes with dry solvent-free solution polymerized SBR (S-SBR) having a 12% vinyl polybutadiene content, a 23.5% styrene content, a Mooney $ML_4$ at 100° C. of 55, and a $T_g$ of −62° C., a ZSK-30 co-rotating twin screw extruder was used with the configuration listed on Table 6 below.

TABLE 6

Status for manual feeding at 20 rpm

| Zone Number | Temp ° C. | Port addition status Rubber and Latex |
|---|---|---|
| 1 | 51 | feed |
| 2 | 116 | closed |
| 3 | 122 | open for venting |
| 4 | 127 | closed |
| 5 | 126 | extrusion |

The aqueous nanoparticle latexes of Examples 19 and 27 were mixed with the S-SBR by the sequence described above to give the products listed on Table 7. Each length of extrudate was mixed on a two roll mill with 10 passes to ensure that the sample for subsequent analysis was homogenous. To conserve on materials three different mixes were sequentially prepared such that the amount of water that needed to be vented off during the process could be evaluated. The results of this indicated that under the conditions chosen, the foam generated by the water removal was found to be mild enough to run continuously for the mixtures chosen.

TABLE 7

| Latex Example | Nanoparticle conc. wt. % | S-SBR gm. | Latex tex mL | Latex Rate mL/ 30 sec | Collected gm. | Observed Venting | Charge wt. % |
|---|---|---|---|---|---|---|---|
| Example 28 | 27 | 36.5 | 58 | 45 | 2.0 | 64 | Trace | 0.221 |
| Example 29 | 27 | 36.5 | 58 | 90 | 4.0 | 94 | Slight foam | 0.362 |
| Example 30 | 19 | 23.2 | 58 | 73 | 3.1 | 65 | Moderate foam | 0.226 |

A solid state NMR technique was developed to determine the true concentration of the nanoparticles in the rubber.

Examples 28A-30A

In Examples 28A-30A the volume fraction of the components in Examples 28-30 were determined by NMR analysis. $^{13}C$ MAS NMR studies were conducted on a Varian Inova spectrometer interfaced to a Doty 5 mm double resonance NMR probe operating at an external magnetic field strength of 11.7 T (corresponding to an observational frequency of 125.68 MHz for $^{13}C$). An rf-field strength of 45 kHz was used and the spinning speed regulated to 3500 Hz. A total of 15,000 transients were acquired while simultaneously decoupling 1H. For the spectrum in FIG. 5C a 4 mm Doty probe operating at a spinning speed of 10 kHz was used.

Figure 5:
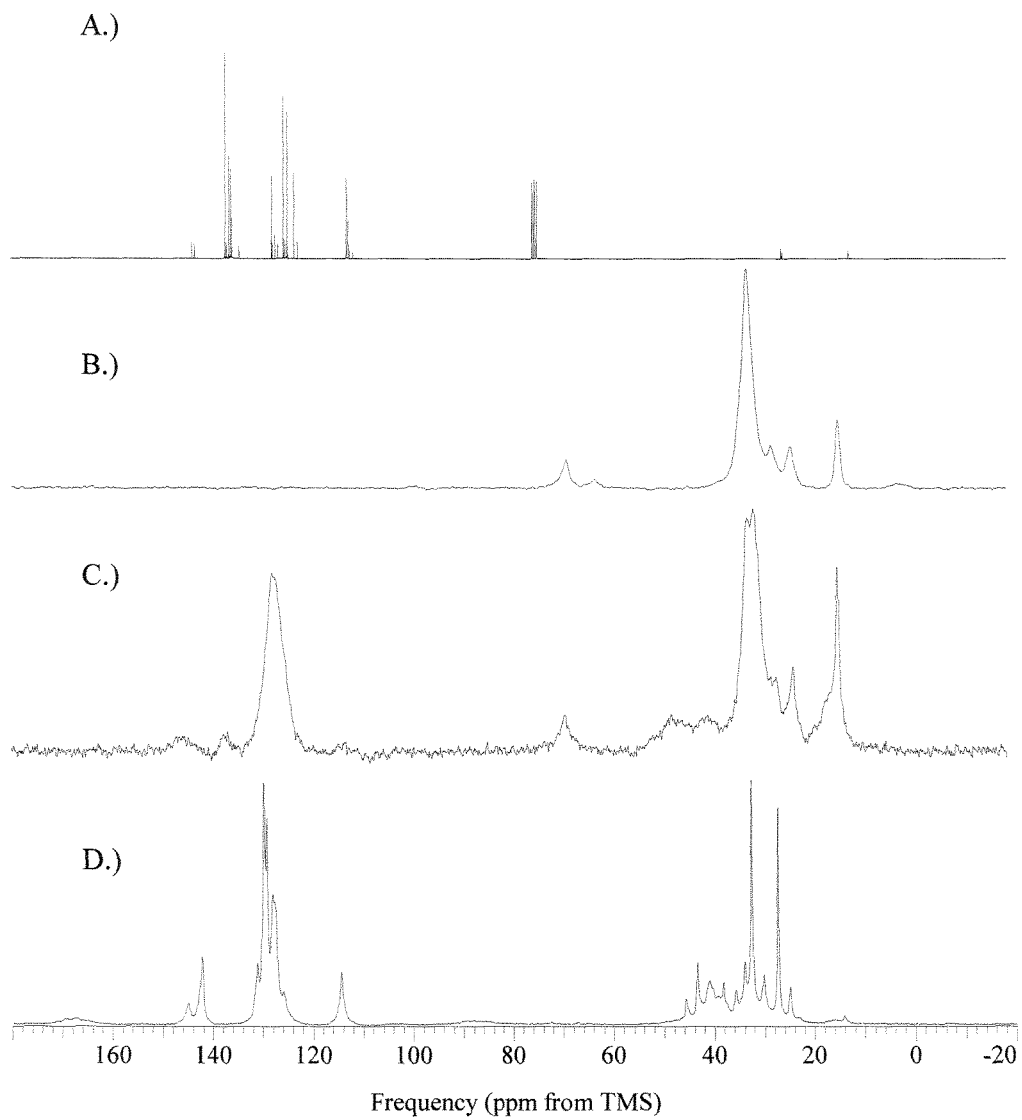
FIG. 5 is $^{13}C$ NMR spectra of A) styrene, ethyl styrene, and DVB monomers in liquid state, B) sodium lauryl sulfate in solid state, C) nanoparticles as described herein in solid state and including the sodium lauryl sulfate, and D) a styrene-butadiene copolymer mixed with the nanoparticles shown in C), in solid state.

FIG. 5 shows: A.) a $^{13}$C liquid state NMR spectrum of ethyl styrene, styrene, and divinyl benzene monomers; and $^{13}$C MAS NMR solid state spectra plotted with normalized intensity of B.) sodium lauryl sulfate (a surfactant used in making nanoparticles), C.) dried nanoparticles of Example 1 containing sodium lauryl sulfate, and D.) the Example 21 nanoparticle and SBR rubber blend (which included the nanoparticles of Example 1.

Attempts to perform 13C liquid state NMR of the aqueous nanoparticle latex was unsuccessful and only resonances from the SLS were observed. This observation is attributed to the size, rigidity, and highly crosslinked structure of the nanoparticles in the latex preventing the particles from rapidly reorienting themselves thus causing resonances to be significantly broadened and, therefore, unobservable on the timescale of the experiment. To confirm, an aliquot of the aqueous nanoparticle latex was placed in a beaker and allowed to air dry for 72 hours after which time the dried nanoparticle composition was analyzed by $^{13}$C MAS NMR (FIG. 5C). Results confirm that the line shapes for the nanoparticles are significantly broad compared to the SLS (FIG. 5B).

The $^{13}$C MAS NMR spectrum of the SBR polymer with nanoparticles (FIG. 5D) indicated almost an identical spectrum to what is expected from a pure SBR. The only clearly resolved peaks between the SBR polymer, the DVB, ES and S of the nanoparticles, and the SLS are the methyl peak on the ES, observable as a broad resonance near 15 ppm (FIG. 5C), the methyl peak of the SLS, observable as a broad peak at 14.3 ppm (FIG. 5B), and the vinyl peaks of the SBR polymer and ethyl styrene DVB monomer mixture, observable at 142 ppm and 115 ppm (FIGS. 5A and 5D). This set of spectra also demonstrate there is substantially no unsaturation in the core of the nanoparticles attributed to the vinyl peaks shown in the FIG. 5A monomer mixture, as such peaks are not present or at least are so small as to be lost in the noise in the spectrum of the formed nanoparticles in FIG. 5C. A peak resulting from unreacted vinyl monomer may be present at about 112 ppm, but it is too small to be identified over the noise.

The vinyl peaks can be used to determine the amount of SBR since the ES, S, and DVB in the nanoparticles should be fully polymerized in the scheme used. The relative amount of ES and S, to DVB was readily measured from the starting material and when mixed with S it was found to be 1.0 to 1.3 to 5.4 moles of ES to DVB to S monomer. Also known is the weight percent of vinyl, styrene, and 1,4 BD in the Std. S-SBR starting material (11% vinyl (polybutadiene), 22.5% styrene). Despite the significant spectral overlap between the nanoparticles and the SBR polymer, therefore, the amount of nanoparticles in the sample can be quantified (Table 8) by using the areas of the vinyl resonances, which only arise from the SBR, the methyl peak of the ES, which is only from the nanoparticles, and the methyl peak for the sodium lauryl sulfate (SLS) at 14.5 ppm through the equations $$\text{Vinyl (g)} = \frac{\text{Area}_{Vinyl(142\ ppm)} + \text{Area}_{Vinyl(115\ ppm)}}{2} 54\ \text{g/mol}$$

$$\text{Ethyl Styrene (g)} = (\text{Area}_{Methyl(15.5\ ppm)})130\ \text{g/mol}$$

$$SLS(g) = (\text{Area}_{SLS-Methyl(14.5\ ppm)})288\ \text{g/mol}$$

Through the appropriate mass balance the amount of S and 1,4 BD can be calculated from the mass of vinyl. Likewise, the amount of polystyrene and DVB in the nanoparticles can be calculated from the mass of ES allowing the total weight percent of each component in the mixture to be determined as reported in Table 8 (all values reported by weight).

TABLE 8

| | Vinyl | Styrene | 1,4 BD | Ethyl Styrene | DVB | Poly-styrene | Nano-particles | SLS |
|---|---|---|---|---|---|---|---|---|
| Example 28 | 7.1 | 17.4 | 54.5 | 3.0 | 3.8 | 12.6 | 19.4 | 1.7 |
| Example 29 | 6.3 | 15.3 | 48.0 | 4.1 | 5.2 | 17.3 | 26.6 | 3.8 |
| Example 30 | 6.8 | 16.6 | 52.1 | 3.4 | 4.3 | 14.3 | 22.0 | 2.6 |

Examples 31-36

In examples 31-36 the nanoparticle/elastomer blend of Examples 28-30 were compounded in a Brabender mixer and cured. Examples 35 and 36 were control examples filled with carbon black. The polymer and filler component of Examples 31 and 32 were comprised entirely of the extrusion blend from Examples 28 and 29 to give 0.10 and 0.25 nanoparticle of stocks in the mixer. Example 33 was blended with the S-SBR to produce a composition with 24.15 phr of nanoparticle filler. In Example 34, unused portions of Examples 31 and 32 were blended to give a desired 31.71 phr filler. Examples 33 and 34 were prepared to have matching $v_f$ of 0.167 and 0.205 with the Control Examples 35 and 36 that were filled with N339 carbon black.

Examples 31-36 were further compounded with 2.5 phr ZnO, 2.0 phr stearic acid, 1.0 phr antioxidant in a 160° C. Brabender having an internal volume of 59 cc with a cam rotor. The final mix was also done in the same Brabender with 1.3 phr sulfur and 1.9 phr accelerators at 90 to 110° C. Curing at 171° C. produced the composition on which the property values reported in Table 9 were determined.

The polymer and nanoparticle dry blends from the extruder were diluted with the S-SBR to achieve a desired volume fraction by conventional rubber mixing techniques. The carbon black-filled Examples 35 and 36 were mixed in the same manner. The volume fraction reported below was determined by NMR and checked by pyrolysis.

Table 9 reports further details of the compositions and their properties.

TABLE 9

| | Ex. 31 | Ex. 32 | Ex. 33 | Ex. 34 | Ex. 35 | Ex. 36 |
|---|---|---|---|---|---|---|
| Polymer/NP Dry Blend from Extruder | Ex. 28 | Ex. 29 | Ex. 30 | blend | none | none |
| NP identity | Ex. 27 | Ex. 27 | Ex.19 | blend | none | none |
| Filler, nanoparticle $d_n$ or (CB type) | 18.7 | 18.7 | 18.7 | 18.7 | N339 | N339 |
| Filler, $v_f$ | 0.100 | 0.248 | 0.167 | 0.205 | 0.167 | 0.205 |

TABLE 9-continued

| | Ex. 31 | Ex. 32 | Ex. 33 | Ex. 34 | Ex. 35 | Ex. 36 |
|---|---|---|---|---|---|---|
| Filler, phr | 13.24 | 40.00 | 24.15 | 31.71 | 39.53 | 51.00 |
| 50% Modulus @ 23° C. (MPa) | 0.82 | 1.08 | 0.79 | 1.02 | 1.19 | 1.57 |
| 300% Modulus @ 23° C. (MPa) | 2.84 | 3.21 | 2.38 | 3.08 | 11.02 | 14.91 |
| Tensile Break Stress @ 23° C. (MPa) | 2.81 | 6.84 | 3.64 | 5.19 | 14.26 | 17.38 |
| Elongation at Break @ 23° C. (%) | 294 | 535 | 430 | 463 | 359 | 340 |
| Toughness @ 23° C. | 4.45 | 16.74 | 8.01 | 11.91 | 21.26 | 25.55 |
| 100% Modulus @ 100° C. (MPa) | 1.04 | 1.03 | 0.97 | 1.06 | 1.9 | 2.55 |
| Tensile Break Stress @ 100° C. (MPa) | 1.43 | 2.22 | 1.47 | 1.96 | 6.71 | 8.70 |
| Tensile Break Stress @ 100° C. (MPa) | 1.43 | 2.22 | 1.47 | 1.96 | 6.71 | 8.70 |
| Elongation at Break @ 100° C. (%) | 170 | 309 | 210 | 265 | 237 | 226 |
| Toughness @ 100° C. | 1.43 | 3.97 | 1.88 | 3.09 | 6.45 | 8.14 |
| tan δ [SS; 60° C.; 10 Hz, 5%] | 0.1136 | 0.1952 | 0.1339 | 0.1747 | 0.1716 | 0.1976 |
| G'(MPa) [SS; 0° C.; 10 Hz, 5%] | 2.658 | 9.09 | 3.099 | 6.288 | 4.771 | 6.77 |
| G'(MPa) [SS; 30° C.; 10 Hz, 5%] | 2.189 | 6.818 | 2.551 | 4.566 | 3.489 | 5.069 |
| G'(MPa) [SS; 60° C.; 10 Hz, 5%] | 1.873 | 4.99 | 2.027 | 3.319 | 2.841 | 3.913 |
| ΔG'(MPa) [SS; 0° C.; 10 Hz, 0.25%-14.25%] | 1.025 | 9.031 | 1.289 | 4.836 | 4.304 | 8.611 |
| ΔG'(MPa) [SS; 30° C;] | 0.885 | 7.36 | 1.228 | 3.851 | 2.824 | 6.116 |
| ΔG'(MPa) [SS; 60° C; 10 Hz, 0.25%-14.25%] | 0.692 | 5.25 | 0.837 | 2.427 | 1.938 | 3.729 |
| 25% Lambourn Index | 1.50 | 0.91 | 1.21 | 1.01 | 1.00 | 0.81 |

Figure 6:
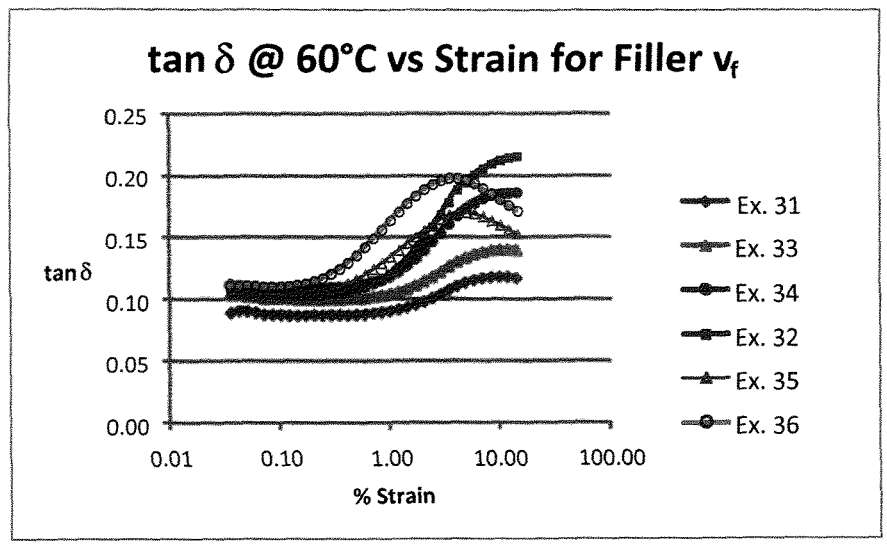
FIG. 6 is a plot of strain sweep (SS) versus tan delta corresponding to Examples 31-37.

The strain sweep (SS) of Examples 31-37 is shown in FIG. 6 and shows that nanoparticles at low strains have lower values in tan δ than the carbon black filled elastomers. However, the nanoparticles do not show a decrease in the tan δ at the highest strain levels. Overall, the nanoparticles show unexpected rubber reinforcement.

It is claimed:

1. A polymeric nanoparticle comprising:
a copolymer comprising vinyl-aromatic monomer contributed units and heterocyclic monomer contributed units;
the copolymer being crosslinked with a multifunctional crosslinking agent that is polymerizable through an addition reaction;
wherein the multi-functional cross-linking agent is a multiple-vinyl-aromatic monomer;
wherein the polymeric nanoparticle is synthesized by aqueous free-radical emulsion polymerization;
wherein the heterocyclic monomer is defined by the following formula:

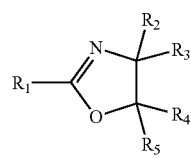

wherein $R_2$-$R_5$ are independently selected from the group consisting of hydrogen, a branched or linear $C_1$-$C_{20}$ alkyl group, a branched or linear $C_3$-$C_{20}$ cycloalkyl group, a branched or linear $C_6$-$C_{20}$ aryl group and a branched or linear $C_7$-$C_{20}$ alkylaryl group, and
$R_1$ is selected from a branched or linear $C_1$-$C_{20}$ group, a branched or linear $C_3$-$C_{20}$ cyclic group, a branched or linear $C_6$-$C_{20}$ aryl group and a branched or linear $C_7$-$C_{20}$ hydrocarbon aryl group and also must have at least a polymerizable double bond.

2. The nanoparticle of claim 1, wherein the heterocyclic monomer comprises an oxazoline group.

3. The nanoparticle of claim 1, wherein the nanoparticle has a weight average diameter of about 10 to about 500 nm as determined by field flow fractionation in THF.

4. The nanoparticle of claim 1, wherein the nanoparticle of claim 1 includes about 0.1 to about 30 weight percent of the heterocyclic monomer contributed unit.

5. The nanoparticle of claim 1, wherein the nanoparticle has a weight average diameter of about 15 to about 100 nm as determined by field flow fractionation in THF.

6. A composition comprising:
an elastomer;
polymeric nanoparticles, wherein the polymeric nanoparticles include a copolymer comprising vinyl-aromatic monomer contributed units and heterocyclic monomer contributed units, the copolymer being crosslinked with a multifunctional crosslinking agent that is polymerizable through an addition reaction;
wherein the composition is sulfur vulcanized;
wherein the polymeric nanoparticles are synthesized by aqueous free-radical emulsion polymerization;
wherein the heterocyclic monomer is defined by the following formula:

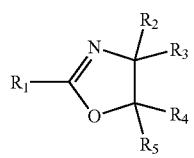

wherein $R_2$-$R_5$ are independently selected from the group consisting of hydrogen, a branched or linear $C_1$-$C_{20}$ alkyl group, a branched or linear $C_3$-$C_{20}$ cycloalkyl group, a branched or linear $C_6$-$C_{20}$ aryl group and a branched or linear $C_7$-$C_{20}$ alkylaryl group, and $R_1$ is selected from a branched or linear $C_1$-$C_{20}$ group, a branched or linear $C_3$-$C_{20}$ cyclic group, a branched or linear $C_6$-$C_{20}$ aryl group and a branched or linear $C_7$-$C_{20}$ hydrocarbon aryl group and also must have at least a polymerizable double bond.

7. The composition of claim 6, wherein the heterocyclic monomer comprises an oxazoline group.

8. The composition of claim 6, wherein the elastomer comprises a functional group selected from the group consisting of: hydroxyl, vinyl, hydroxylaromatic, and carboxylate.

9. The composition of claim 6, wherein the elastomer is selected from the group consisting of: poly(styrene-butadiene), polybutadiene, natural rubber, polyisoprene, poly(isoprene-butadiene), poly(styrene-isoprene), poly(isoprene-butadiene-styrene), nitrile rubber, halobutyl rubber, butyl rubber, and combinations thereof.

10. The composition of claim 6, wherein the composition is incorporated into a tire component.

11. The composition of claim 6, wherein the heterocyclic monomer comprises an oxazoline functional group; and the elastomer comprises a functional group selected from the group consisting of: hydroxyl, vinyl, hydroxylaromatic, and carboxylate.

12. The composition of claim 6, wherein the elastomer is a latex elastomer having a number average molecular weight of at least about 150 kg/mol.

13. The composition of claim 6, wherein the multi-functional cross-linking agent is a multiple-vinyl-aromatic monomer.

14. The composition of claim 6, wherein the polymeric nanoparticles have a weight average diameter of about 10 to about 500 nm as determined by field flow fractionation in THF.

15. The composition of claim 6, further comprising silica, carbon black, or both.

16. A polymeric nanoparticle comprising:
  a copolymer comprising vinyl-aromatic monomer contributed units and heterocyclic monomer contributed units;
  the copolymer being crosslinked with a multifunctional crosslinking agent that is polymerizable through an addition reaction;
  wherein the multi-functional cross-linking agent is a multiple-vinyl-aromatic monomer, and the heterocyclic monomer comprises an oxazoline functional group.

* * * * *